(12) United States Patent
Kliethermes et al.

(10) Patent No.: US 12,529,687 B1
(45) Date of Patent: Jan. 20, 2026

(54) SYSTEM FOR REMOTELY COLLECTING AND MONITORING EXPOSURE DATA IN REAL-TIME FOR AN ISOLATED WORKER CONFINED TO A WORK AREA IN A HAZARDOUS MATERIALS ENVIRONMENT

(71) Applicant: The Center for Toxicology and Environmental Health, LLC, North Little Rock, AR (US)

(72) Inventors: Derek Kliethermes, League City, TX (US); Justin Langley, League City, TX (US); Cole Tinsley, League City, TX (US); Scott Skelton, Quitman, AR (US)

(73) Assignee: THE CENTER FOR TOXICOLOGY AND ENVIRONMENTAL HEALTH, LLC, North Little Rock, AR (US)

( * ) Notice: Subject to any disclaimer, the term of this patent is extended or adjusted under 35 U.S.C. 154(b) by 225 days.

(21) Appl. No.: 18/197,810

(22) Filed: May 16, 2023

Related U.S. Application Data

(60) Provisional application No. 63/342,944, filed on May 17, 2022.

(51) Int. Cl.
*G01N 33/00* (2006.01)

(52) U.S. Cl.
CPC ................ *G01N 33/0075* (2013.01)

(58) Field of Classification Search
CPC ....... G01N 33/0075; G08B 21/12; H04Q 9/00
See application file for complete search history.

(56) References Cited

U.S. PATENT DOCUMENTS

| 5,517,866 A | * | 5/1996 | Manning | G01N 1/2273 73/863.21 |
| 6,114,964 A | * | 9/2000 | Fasano | G01N 33/0075 340/628 |

(Continued)

FOREIGN PATENT DOCUMENTS

| FR | 3043776 A1 | * | 5/2017 | ............. B60H 1/008 |
| WO | WO-2011103165 A1 | * | 8/2011 | ............. G08C 17/02 |

OTHER PUBLICATIONS

Daniel J. Soeder, Fracking and the Environment, 2020.
(Continued)

*Primary Examiner* — Adnan Aziz
(74) *Attorney, Agent, or Firm* — FRESH IP PLC

(57) ABSTRACT

A system for collecting and monitoring exposure data for an isolated worker confined to a work area in a in a hazardous materials environment includes a host computer and a display monitor located remotely from the hazardous materials environment; a first air monitor for monitoring levels of volatile organic compounds (VOCs) in ambient air outside the work area, the first air monitor being operably connected to the host computer to provide a display of the VOCs outside the work area in real-time on the display monitor; a second air monitor for monitoring levels of VOCs in ambient air inside the work area, the second monitor being operably connected to the host computer to provide a display of the VOCs inside the work area in real-time on the display monitor; and a gas sensor disposed inside the, the gas sensor being operably connected to the host computer to speciate the VOCs inside the work area into constituent chemicals and provide a display of the constituent chemicals in real-time on the display monitor.

18 Claims, 9 Drawing Sheets

(56) References Cited

U.S. PATENT DOCUMENTS

| | | | | |
|---|---|---|---|---|
| 7,487,662 | B2* | 2/2009 | Schabron | G01N 33/0031 73/1.01 |
| 10,429,330 | B2* | 10/2019 | Le Neel | G01N 33/0047 |
| 11,854,366 | B1* | 12/2023 | Thoma | H04Q 9/00 |
| 12,092,624 | B2* | 9/2024 | Conway | G01N 33/0034 |
| 2012/0143515 | A1* | 6/2012 | Norman | G01N 33/0073 702/24 |
| 2018/0017536 | A1* | 1/2018 | Le Neel | G01N 33/0047 |
| 2018/0325422 | A1* | 11/2018 | Sokol | A62B 7/10 |
| 2020/0058083 | A1* | 2/2020 | Mifsud | G06Q 50/06 |
| 2022/0091026 | A1* | 3/2022 | Scott | G01P 13/045 |
| 2022/0277254 | A1* | 9/2022 | Feeney | G08B 21/02 |

OTHER PUBLICATIONS

Gowda et al., Identification of hydroxy- and keto-dicarboxylic acids in remote marine aerosols using gas chromatography/quadruple and timeof-flight mass spectrometry, 2016.
Lassalle et al., Monitoring oil contamination in vegetated areas with optical remote sensing: A comprehensive review, 2020.
Olaguer, et al., Real time measurement of transient event emissions of air toxics by tomographic remote sensing in tandem with mobile monitoring, 2017.
Mickunas et al., Remote optical sensing instrument monitoringto demonstrate compliance with short-term exposure action limits during cleanup operations at uncontrolled, 1995.
Ran et. al., Short-term effects of ambient benzene and TEX (toluene, ethylbenzene, and xylene combined) on cardiorespiratory mortality in Hong Kong, 2018.
Garg, et. al., Zebra GC: A mini gas chromatography system for trace-level determination of hazardous air pollutants, 2015.
Do, et. al., Airborne volatile organic compounds in urban and industrial locations in four developing countries, 2015.
Galan-Madruga, et. al., An optimized approach for estimating benzene in ambient air within an air quality monitoring network, 2022.
Dewulf et. al., Analysis of volatile organic compounds using gas chromatography, 2002.
Sexton, et. al., Assessing Cumulative Health Risks from Exposure to Environmental Mixtures—Three Fundamental Questions, 2007.
Chen, et. al., Association of PAHs and BTEX exposure with lung function and respiratory symptoms among a nonoccupational population near the coal chemical industry, 2018.
Heibati, et. al., Biomonitoring-based exposure assessment of benzene, toluene, ethylbenzene and xylene among workers at petroleum distribution facilities, 2018.
Tian, et. al., Characteristics analysis for total volatile organic compounds emissions of methanol-diesel fuel, 2018.
Monosson, Chemical Mixtures: Considering the Evolution of Toxicology and Chemical Assessment, 2005.
Nasreddinea, et. al., Development of a novel portable miniaturized GC for near real-time low level detection of BTEX, 2016.
Venkatesan, et. al., Effective Strategies for Monitoring and Regulating Chemical Mixtures and Contaminants Sharing Pathways of Toxicity, 2015.
Brady et. al., Evolutionary toxicology: Toward a unified understanding of life's response to toxic chemicals, 2017.
Sun, et. al., Fabrication and characterization of microelectromechanical systems-based gas chromatography column with embedded micro-posts for separation of environmental,2013.
Wilson,Remote Real-Time Industrial Hygiene Monitoring, 2012.
Tunsaringkarn et. al., Occupational Exposure of Gasoline Station Workers to BTEX Compounds in Bangkok, Thailand, 2012.
1Occupational Safety and Health Administration, 910. 120,Hazardous waste operations and emergency response.
Mulhern, AreaRAE Plus & AreaRAE Pro User's Guide, 2017.
Aghaeipoor, Characterization of Preliminary Data of Indoor Air Quality in Diesel Construction Equipment Cabs, 2014.
World Health Organization Regional Office for Europe Copenhagen, Air Quality Guidelines, 2000.
Garcia et. al., Effectiveness of Cabs for Dust and Silica Control on Mobile Mining Equipment.
Straub, High Risk, Lone Worker, 2018.
Potera, Indoor Air Quality, 2011.
CSB, Storage Tank Fire at Intercontinental Terminals Company, LLC (ITC) Terminal, 2019.
Walter, Managing risks to lone workers, 2012.
MultiRAE Series User's Guide, 2017.
Tunsaringkam et. al., Occupational Exposure of Gasoline Station Workers to BTEX Compounds in Bangkok, Thailand, 2012.
OSH Act of 1970,Occupational Safety and Health Administration.
CSB,Fires and Explosions at TPC Group Port Neches Operations Facility, Factual Update, 2020.

* cited by examiner

SYSTEM FOR REMOTELY COLLECTING AND MONITORING EXPOSURE DATA IN REAL-TIME FOR AN ISOLATED WORKER CONFINED TO A WORK AREA IN A HAZARDOUS MATERIALS ENVIRONMENT

RELATED APPLICATION

This is a nonprovisional application claiming the benefit of Provisional Application Ser. No. 63/342,944, filed May 17, 2022.

FIELD OF THE INVENTION

The present invention is directed to a system for remotely collecting and monitoring exposure data in real-time using gas chromatography and photo-ionization detection for an isolated worker confined to a work area in a hazardous volatile chemical environment.

BACKGROUND OF THE INVENTION

Chemical-specific air monitoring in real-time provides essential exposure information to trained operators and technicians responding to emergencies involving the release of Hazardous Materials (HAZMAT). At times, HAZMAT operators may be isolated within their remediation effort and without sufficient exposure information. This has forced them to rely on personal protective equipment (PPE) to perform their work. Operations could be enhanced if this information is communicated in real-time. Previous air monitoring technology has supported either analytical media for laboratory analysis or manual operation of an instrument for most chemical-specific exposure data; thus, a limiting factor has been the inability to communicate this critical information to isolated workers in real-time.

Previous air monitoring technology has supported either analytical media for laboratory analysis or manual operation of an instrument for most chemical-specific exposure data. RAE Systems developed remote technology for volatile organic compound (VOC) data collection, however, a very broad spectrum of volatiles can be picked up on the photo-ionization detector (PID) and it is not chemical-specific and nor can it speciate VOCs, especially when working with mixtures.

The lone or isolated worker has been defined in a Health and Safety Executive guidance document to be those working alone in different environments, without a direct form of supervision (Brennan, 2012). Brennan's focus was to establish a risk management system from a corporate perspective across many disciplines; from petrol station workers, to security, to transportation workers (Brennan, 2012). Isolated workers, referenced in this document, will be only involved with emergency response with HAZMAT operations and can be more narrowly defined as workers that are working alone or in small groups with potential for chemical exposure with unknown atmospheric conditions.

OSHA's Hazardous Waste Operations and Emergency Response (HAZWOPER) standard, 29 CFR 1910.120, states that workers need to utilize the "buddy system" when working in the Hot Zone. In CFR 1910.120(a) (3), OSHA defines "buddy system" as a means of assigning employees into work groups with the designation that each employee must be in constant observation by at least one other employee in the same work group, thus, to be able to provide immediate assistance in case of emergency. (OSHA, United States Department of Labor-CFR 1910.120 Hazardous Waste Operations and Emergency Response, 2019). In CFR 1910.120(d) (3), OSHA states that one of the required elements of an established Site Control program is the use of the buddy system. This goes for all hazardous waste sites and operations. In CFR 1910.120(q) (3) (v) for emergency response, OSHA requires the person in charge (PIC) of the response to limit workers with potential chemical exposure to only those workers that are preforming emergency operations and that those workers are required to use the buddy system in groups of 2 or more. (OSHA, 29 CFR 1910.120-Hazardous waste operations and emergency response, 2019).

Also found in emergency response section 1910.120(q) (4), OSHA discusses skilled support personnel, workers "who are skilled in the operation of certain equipment, such as mechanized earth moving or digging equipment." These workers must be provided equal safety and health precautions regarding chemical exposure information, personal protective equipment (PPE), the buddy system, and any and all other health and safety assurances, even though these skilled workers may be isolated in their operations or machines (OSHA, 29 CFR 1910.120-Hazardous waste operations and emergency response, 2019). The following are two common examples of isolated HAZMAT workers that are often seen in ERs: 1). Isolated workers operating machinery in remediation and recovery efforts during chemical spills or following facility fires involving mixture of chemicals; 2). Isolated workers composed of specialized technicians apart of initial entry teams that work in very small groups making investigative entries into unknown conditions within hot zones.

These types of work activities may align with having lower quality air monitoring information or equipment that may not support some chemical-specific identification; namely, only having ability to monitor only for flammability or volatile organic compound (VOCs) using a 5-gas monitor which proves to be a gap when dealing with some product mixtures, specifically benzene and other carcinogens (IND-SCI, 2020). As recognized by (Straub, 2018), hazard identification is a key component to safe working conditions and as we assess hazards created by lone work activities and encountered by unattended workers, we must make every effort to not allow these workers to be put at a higher risk than any other response workers (OSHA, OSH Act of 1970, General Duty Clause, 2004). Additional information on HAZMAT operations can be found within 29 CFR 1910.120-Hazardous waste operations and emergency response (OSHA, 29 CFR 1910.120-Hazardous waste operations and emergency response, 2019). Pohanish provides relative information for a variety of HazMat chemicals regarding exposure, health hazards, and toxicity on each chemical involved in first response, transportation, and storage (Pohanish, 2004).

According to the EPA, "Volatile organic compounds, or VOCs are organic chemical compounds whose composition makes it possible for them to evaporate under normal indoor atmospheric conditions of temperature and pressure" (EPA, 2021). The most volatile constituents typically have the lowest boiling points, hence they are likely to present themselves in air via evaporation before those constituents with higher boiling points, like a semi-volatile (SVOC). For example, propane has a boiling point equal to −44° F. (NIOSH, Centers for Disease Control and Prevention—The National Institute for Occupational Safety and Health, 2019), which is much more volatile than polychlorinated biphenyl (PCB) with a boiling point of 689-734° F. (NIOSH, Centers for Disease Control and Prevention—The National Institute for Occupational Safety and Health, 2019). Both are VOCs, both react very differently. When monitoring with a photo-ionization detector (PID) it's important to understand a few concepts: 1.) which chemical properties are more likely to be recognized, highly volatile over low volatility, and 2.) what is the ionization energy (eV) of the chemicals you are dealing with and will it be recognized on the instrument, depending on the type a lamp installed within that instrument (i.e., 9.8 eV, 10.6 eV, 11.7 eV). Propane makes a great example as it has an ionization energy of 10.95 eV, therefore even though it is highly volatile, it will not be recognized on an instrument using a standard 10.6 eV lamp (RAE, A Guideline for PID Instrument Response, 2021).

"Knowledge about the VOCs that are present at low concentrations normally found in indoor air in any given situation is highly dependent on how they are measured. All available measurement methods are selective in what they can measure and quantify accurately, and none are capable of measuring all VOCs that are present. For example, benzene and toluene are measured by a different method than formaldehyde and other similar compounds. The range of measurement methods and analytical instruments is large and will determine the sensitivity of the measurements as well as their selectivity or biases. This is why any statement about VOCs that are present in a given environment needs to be accompanied by a description of how the VOCs were measured so that the results can be interpreted correctly by a professional. In the absence of such a description, the statement would have limited practical meaning." (EPA, 2021).

This quote distinguishes the reasoning behind investigating the constituents of VOCs or to determine speciation of VOCs in each monitoring scenario. In an indoor air quality (IAQ) study performed on scented air freshener products, they found over 100 unique VOCs with little to no information on the safety data sheets (SDS). Many were carcinogenic and hazardous air pollutants (Potera, 2011).

Typically, when we think of hydrocarbon products (i.e., gasoline blends, crude oil, or aromatic derivatives) in emergency response, we often quickly associate benzene, toluene, ethyl-benzene, xylenes (BTEX). BTEX have been associated as the main chemical constituents of aromatic VOCs (Ran, Qiu, Sun, & Tian, 2018). Since 1979, according to the International Agency for Research on Cancer (IARC) benzene has been determined to be a group-1 human carcinogen (Do, et al., 2015) and then reaffirmed in 2009 (Loomis, et al., 2017). The World Health Organization (WHO) has identified benzene as a group-1 carcinogenic risk and described inhalation as the predominant pathway of exposure and hematological effects with varying levels of severity in exposed workers. This study ultimately concluded that there are no safe levels of exposure that can be recommended for benzene exposure (WHO, 2000) (Do, et al., 2015).

Similar Exposure Groups (SEGs) are defined as working groups working on the same work task in a working environment with similar exposure potential. Gaffney, et al., 2011 had unique scientific approach to creating similar exposure groups and validating occupational exposure at the ExxonMobil Refinery in Baytown, TX. Gaffney, et al., 2011 assessed many different exposure groups over a span of 28 years to better understand exposure risk and what controls could be implemented to reduce those risks, based on data collected. Ultimately, the focus became task-specific and those working with pipefitting, welding, and blinding were at most risk, yet comparatively, remained lower across the industry with control implementation (Gaffney, et al., 2011). In this study over the span of over 25 years and nearly 10,000 samples collected specific to benzene, each of those workers had to wait until samples were delivered to a lab, laboratory analysis was performed, and industrial hygienists were notified of results multiple days later to be notified if an exposure could have occurred.

When we think of chemical mixtures, it becomes a complex science of exposure potential for industrial hygienists and toxicologists. Over 100 years there has been a common interest in characterization and regulation for worker safety. Yet, we are hardly ever experiencing exposure to a single chemical, but rather experiencing exposure to mixtures of chemicals (Monosson, 2005). For the most part, these mixtures remain to be unknown unless we have some chemical-specific monitoring capability that can provide detailed information of exposure potential. The author states there is a need for new and improved methods to collect data from chemical mixtures to learn more about exposure, and based on current methods and research that has been performed, we have restricted our ability to learn (Monosson, 2005). Monosson also notes in her conclusion that the evolution of toxicology revolves not only about understanding the exposure of a single chemical but learning more about the exposure of combined chemical exposure and understanding how that chemical combination may behave in the human body (Monosson, 2005). The takeaway is the ability to not only understand benzene exposure from a chemical mixture but also let us look at methods that could single out most or all the key chemicals involved during the exposure to that mixture. For example, could there be a synergistic type of relationship on the human body having exposure to both benzene and toluene at the same time? If so, how can it be characterized and would it change the current OELs (occupational exposure limit)? The only way to begin to answer this question is to find a method that can monitor both analytes at the same time.

When we think about assessing health risk to chemical mixtures, many questions come to mind. Sexton poses fundamental questions on chemical mixtures, the nature and magnitude of exposure, and the consequence of effects on human health. Innovative technologies in monitoring are one of the most valued trends that can benefit exposure assessment (Sexton & Hattis, 2007). Examples of toxicokinetic and toxicodynamic interactions are well-defined in this article and there is suggestion of the unknown interactions between exposure to multiple chemicals at the same time may produce unfavorable interaction in the human body.

A chemical-specific method of detecting multiple analytes for comparative analysis could provide more answers to questions of cumulative effects of exposure (Sexton & Hattis, 2007). Another study noted to have found a synergistic effect between benzene and toluene, also noting that exposure was significantly associated with fatigue, therefore suggesting implementation of plans to protect gasoline station workers (Tunsaringkarn, Siriwong, Rungsiyothin, & Nopparatbundit, 2012). Tian found that benzene and toluene were the two main constituents of a total VOC analysis from methanol diesel emissions (Tian, et al., 2018). "One major concern with chemical mixtures is the possibility of including synergistic effects, whose overall effects exceed the sum of adverse impacts caused by individual exposures" (Venkatesan & Halden, 2015). As of 2015, more than 84,000 chemicals have been inventoried in the US Toxic Substances Control Act. The current estimation is that 10% of these chemicals could be labeled as carcinogens (Venkatesan & Halden, 2015) (Wiley, 2017).

A study involving BTEX exposure comparisons of both indoor and outdoor ambient air near the coal industry suggests long-term exposure could alter lung airways and functionality and intervention could reduce those risks (Chen, et al., 2018). When proposed with the thought of an isolated worker performing tasks inside the cab of heavy machinery, one could think that the cab provides some protection from the ambient air outside the cab. As noted in this mining study that an operator's cab can provide protection to the worker with reduction to peak dust concentrations, provide routine maintenance takes place (Garcia, Gresh, Gareis, & Haney, 1999).

As seen in indoor setting with poor ventilation, eventually the air inside the cab may prove to be worse than the ambient air outside the cab. In this thesis, the author attempts to characterize indoor air quality (IAQ) of an operator's cab in construction equipment. It is noted that elevated VOCs came from the diesel exhaust with the potential for heptane and benzene to be present. The author explains how if heptane was the primary VOC, there would not be a problem with an OEL of 400 ppm, conversely if benzene was the primary VOC with an OEL of 0.5 ppm, then the operator could have experienced an exposure above the 8-hour time-weighted average (TWA) and also well above a short-term exposure limit (STEL) of 15-minutes. Therefore, specific tests for VOCs are recommended by the author (Aghaeipoor, 2017). Later in the report, an overall comparison of air monitoring limits was provided and moving forward the author was forced to use 0.5 ppm for total VOCs limit, as it corresponds to exposure (Aghaeipoor, 2017). If one cannot speciate the VOCs and is certain there are constituents with low OELs (i.e., benzene & 1,3 butadiene, for example of 0.5 ppm) (ACGIH, 2020), then one must error on the side of caution and establish a VOC action level equal to the lowest OEL action level. After further data was analyzed, the study experienced VOC data that exceeded the established limit and stated that no conclusion could be drawn and further testing would be necessary. Ultimately, the author found that all air pollutants being measured were found to be higher inside the operator's cab than the outside ambient air (Aghaeipoor, 2017).

Traditional technology has been used to protect isolated workers safe from VOC exposure. (Wilson, 2012) published a study of the remote application of real-time air monitoring for VOCs, benzene, heat stress, radiation, and dust and declared this innovative technology to be the world's first performed on offshore exploration drilling. Wilson denotes some problematic areas with exposure potential (i.e., uncommon or unplanned events) that this system could capture, where otherwise a roaming Industrial Hygienist may miss the opportunity to capture this event (Wilson, 2012). Therefore, a remote sentinel monitoring system strategically placed, much like the ProRAE Guardian, could capture these events and expand the footprint of monitoring capabilities. The AreaRAE system was the world's first air monitoring system using remote technology with built in radio-frequency (RF) modems to connect to a host, giving it the ability to view remote data. This system was introduced to the market in 2001 as a 5-gas air monitoring instrument with wireless capability to assess for VOCs, LEL, oxygen, and two other substance-specific sensors, for example carbon monoxide and hydrogen sulfide (RAE, AreaRAE Remote Monitoring System, 2001). However, the remote technology cannot speciate VOCs for BTEX detection.

According to the Louisiana Department of Health and Hospitals, from Apr. 25 to Sep. 18, 2010, there were 411 reports of health complaints believed to be related to exposure to pollutants from the Macondo oil spill. Three hundred and twenty five of these reports came from response personnel and 86 from the general population. The most frequently reported symptoms were headache, dizziness, nausea, vomiting, weakness/fatigue and upper respiratory irritation. Due to a lack of chemical-specific air monitoring, especially for clean-up workers in vessels, direct correlations between chemical exposure and health complaints could not be determined (Wilson, 2012) (ldh.la.gov, 2010).

The AreaRAE system has been an amazing technological innovation of its time. Wilson suggests it can capture unplanned events and create a larger safety footprint for industrial hygiene with its remote technology, specifically for benzene (Wilson, 2012). However, currently photo-ionization detector technology cannot monitor specifically for benzene unless applying a correction factor (CF) or unless using different instrumentation, such as the UltraRAE 3000 benzene-specific instrumentation via a benzene prefilter separation (SEP) tube that will scrub out moisture and other hydrocarbons (RAE, Handheld PID Monitors, 2021) (Manes, Collodi, Fusco, Gelpi, & Manes, 2012). The Ultra-RAE 3000 technology doesn't currently operate remotely, and to note, the SEP tube would need to be manually changed once saturation occurs; therefore, this instrument is most applicable as a handheld unit.

Application of a correction factor for a mixture can only be determined if all constituents are known, as well as the percentage of the vapor phase of that chemical within the mixture. Then, the percent and the correction factor specific to that chemical can be entered into a CF-mix formula provided on RAE Systems Technical Note TN-106 (RAE, A Guideline for PID Instrument Response, 2021), incorporated herein by reference. However, this would not be the best applicability when there are already benzene-specific monitoring instruments on the market. This calculation approach would be at best an estimation based on a products safety data sheet (SDS) or source sample. Product SDSs primarily only provide % weight and these can be presented in ranges and the components can be mostly proprietary to conserve intellectual property. Another situation that can often be found in ERs are product mixtures that have mixed with other product mixtures; therefore, a source sample sent to the lab for analysis would be the best option if chemical-specific instrumentation is not available.

Another study focused on analysis of VOCs by gas chromatography. They state that any other type of analysis of VOCs would have limiting factors (Dewulf & Langenhove, 2002). For example, another benzene-specific air monitoring instrument that could be considered would be the colorimetric tube and manual pump. This device consists of a manual pump that draws air through a tube matrix that scrubs out other constituents and creates a color change to identify concentration in the ambient air. This is a great chemical-specific technology and can easily be performed; the only drawback is it is not a direct read instrument that is constantly providing information. In my opinion, it would be considered more of an investigative type of instrument, as there is a time component to the manual pump and color change to take place. There can also be interference if other chemicals from the mixture break through the matrix within the tubes (this information is provided within the instruction pamphlet).

Madruga takes an approach on benzene-specific monitoring by validating an equation that will estimate benzene concentrations via the use of established air quality networks (AQMN). This method considers nitrogen dioxide and ozone levels and pairs them with meteorological data to provide benzene estimations in ambient air environments surrounding the AQMN (Galán-Madruga & Garcia-Cambero, 2022). This is an interesting approach to determine what areas in a community network system may have been exposed to benzene based on weather conditions. This approach is more of a comparative analysis on urban traffic versus rural background conditions. This type of data analysis would be interesting for community exposure profile during an ER to understand impact outside the fenceline, if any. However, this system would not be suitable for work operations.

There are limitations of current remote data collection instrumentation with chemical mixtures (Venkatesan & Halden, 2015) (Carpenter, Arcaro, & Spink, 2002). Olaguer provides an interesting article about monitoring during a loading procedure and detecting toluene and xylene outside of a fenceline and how we could better protect the workers (Olaguer, et al., 2017). There could be some relative information and procedural information pulled from this article, even methods regarding stationary monitoring on a perimeter; however, they are estimating emissions and inversely modeling. P. 227 refers to a review of measuring techniques.

(Mickunas, Zarus, Turpin, & Campagna, 1995), could be of use as a reference for remote monitoring in an occupational setting. They use open-path Fourier transform infrared spectroscopy (Remote optical sensing technology) to estimate SO2 exposure in this case study. Bluetooth technology has been a great advancement in air monitoring technology (Garg, et al., 2015), article supported by NIOSH. There could be funding for more advanced remote technologies. Zebra GC has Bluetooth technology to stream data to a laptop; however, Bluetooth limitations are distance (30-40'=loss of connection). (Garg, et al., 2015) makes great observations about the importance of making VOCs chemical specific with a GC rather than using a PID or colorimetric tubes.

Biomarkers, or biological samples like urine or breath, can provide exposure metrics as well. In the USA, this sample is collected as a confirmation sample after a specific task or at the end of the shift and then run for analysis to determine exposure and effectiveness of PPE and any implemented controls, as it would be considered unethical to use people as dosimeters or way of collecting a sample. A study in Iran used this method among working groups at a petroleum distribution facility. This study defined their similar exposure groups (SEGs) as tank-loading, tank-gauging, truck drivers, firefighters, and office workers to collect data over a variety of work tasks (Heibati, et al., 2018). Heibati found that the tank loading and tank gauging procedures experienced the highest levels of benzene exposure, based on their urine biomonitoring. This study gave them an opportunity to provide solutions via admin controls, by simply suggesting better work practices (Heibati, et al., 2018). Sometimes simple things as better work practices can support less exposure.

Analytical sampling using pump driven media and organic vapor passive dosimeter badges are collected at the end of the day and sent to the lab for analysis. Time is the major limitation involved with this sampling method, although required for benzene, this method still provides results from days past rather than real-time chemical-specific results. This method used in conjunction with a real-time chemical-specific approach should allow health and safety professionals to have confirmation that exposure was prevented.

Wearing badges and having real-time BTEX data communicated is more helpful and less hindering for worker than wearing analytical pumps. Delay of getting results to understand what exposure, if any, may have occurred will always be a factor in current analytical sampling methodologies. Rather than waiting multiple days on analytical results to tell if a worker was potentially exposed, the Sentinel Protocol method of data collection allows the industrial hygienist to feel confident the best courses of action were taken in real-time and then later support and validate those decisions with the analytical results of the passive badges collected from the workers.

The transportation industry has established effective communication systems that can be helpful for communication for isolated workers. Roadway workers in railroad operations offer a great example of systematically working and communicating as a team. Depending on the event and distances between operations, individuals may be working alone or in small groups amidst live track operations and/or HAZMAT operations from damaged railcars. Proactive strategies and shared situational awareness allow for dispatchers, roadway workers, and train crews to experience safe and efficient work activities (Roth, Multer, & Raslear, 2006). Another effective strategy is the use of track warrant control for worker safety, according to the Railroad's General Code of Operating Rules (GCOR). Track warrant control is a method that authorizes movement of trains with a series of checks and balances that protect personnel and machines on a main track (GCOR Committee, 2015).

SUMMARY OF THE INVENTION

The present invention, called the Sentinel Protocol, provides a system for collecting and monitoring exposure data for an isolated worker confined to a work area in a hazardous materials environment, comprising a host computer and a display monitor located remotely from the hazardous materials environment; a first air monitor for monitoring levels of volatile organic compounds (VOCs) in ambient air outside the work area, the first air monitor being operably connected to the host computer to provide a display of the VOCs outside the work area in real-time on the display monitor; a second air monitor for monitoring levels of VOCs in ambient air inside the work area, the second monitor being operably connected to the host computer to provide a display of the VOCs inside the work area in real-time on the display monitor; and a gas sensor disposed inside the work area, the gas sensor being operably connected to the host computer to speciate the VOCs inside the into constituent chemicals and respective concentrations and provide a display of the constituent chemicals in real-time on the display monitor.

The present invention also provides a system for establishing a hot-zone perimeter around a hazardous chemical environment generated by a leaking product, comprising a host computer and a display monitor located remotely from the hazardous chemical environment; a plurality of air monitoring stations disposed between the leaking product and an emergency response team's entry point into the hazardous chemical environment, the air monitoring stations defining a perimeter around the leaking product; each of the stations comprising an air monitor and a gas sensor operably connected to a remote host computer with a display monitor to provide a display on the display monitor of the VOCs around the station in real-time; the air monitor for monitoring levels of volatile organic compounds (VOCs) in ambient air around the station, the air monitor being operably connected to the host computer to provide a display on the display monitor of the VOCs around the stations in real-time, the air monitor being disposed to represent a breathing zone of a worker; and the gas sensor to speciate the VOCs around the station into constituent chemicals and respective concentrations and provide a display of the constituent chemicals in real-time on the display monitor, the gas sensor being co-located with the air monitor.

The present invention further provides a method for collecting and monitoring exposure data for an isolated worker confined to a work area in a hazardous materials environment, comprising remotely monitoring levels of VOCs in ambient air outside the work area in real-time; remotely monitoring levels of VOCs in ambient air inside the work area occupied by the isolated worker in real-time; and remotely performing gas chromatography and photo-ionization detection in real-time to speciate the VOCs inside the confinement of the equipment cab when the VOCs inside the work area reach a certain level.

The present invention, called Sentinel Protocol, utilizes remote data collection through gas chromatography. The Dräger X-Pid® 8500/9500 has the capability to monitor up to 46 chemical constituents. With the present invention, this instrument can be operated remotely, and therefore lab quality exposure data can be communicated to isolated workers in real-time. The present invention will create safer working environments, improve and enhance operational workflow, and allow HAZMAT operators to have more comfort and confidence in their ability to work in hazardous conditions.

DETAILED DESCRIPTION OF THE INVENTION

The present invention is directed to providing advanced protection and communication for those working in isolation within hazardous chemical atmospheres, and to ultimately change the approach to worker exposure methods throughout industry.

The present invention provides for protecting a worker by remotely monitoring in real-time the air containing VOCs that migrates inside the cab, and remotely speciate the VOCs in real-time to better understand potential for exposure.

Figure 1A:
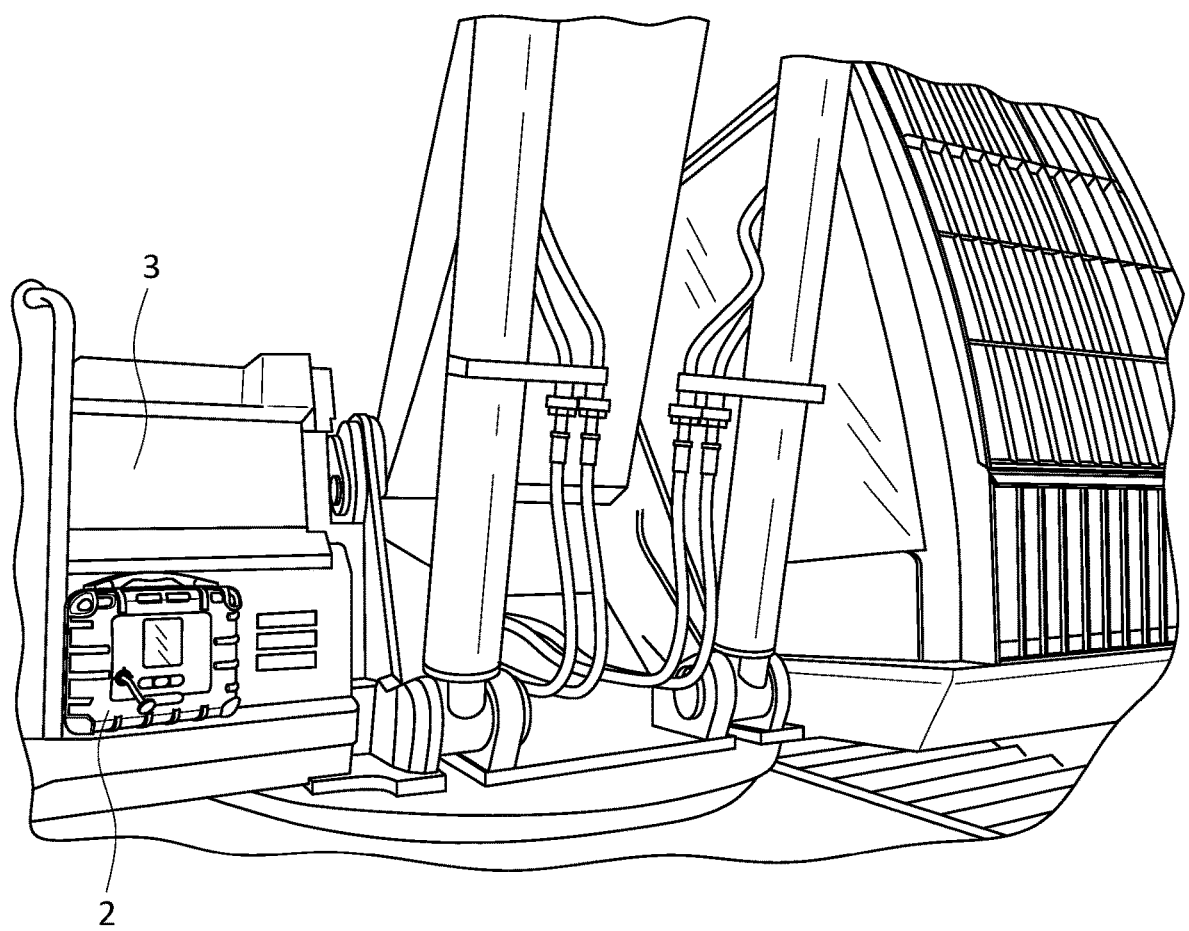
FIG. 1A shows an air monitor attached to the outside of a heavy equipment cab for monitoring volatile organic compounds (VOCs) and flammability based on a percent of the lower explosive limit (LEL).
Figure 1B:
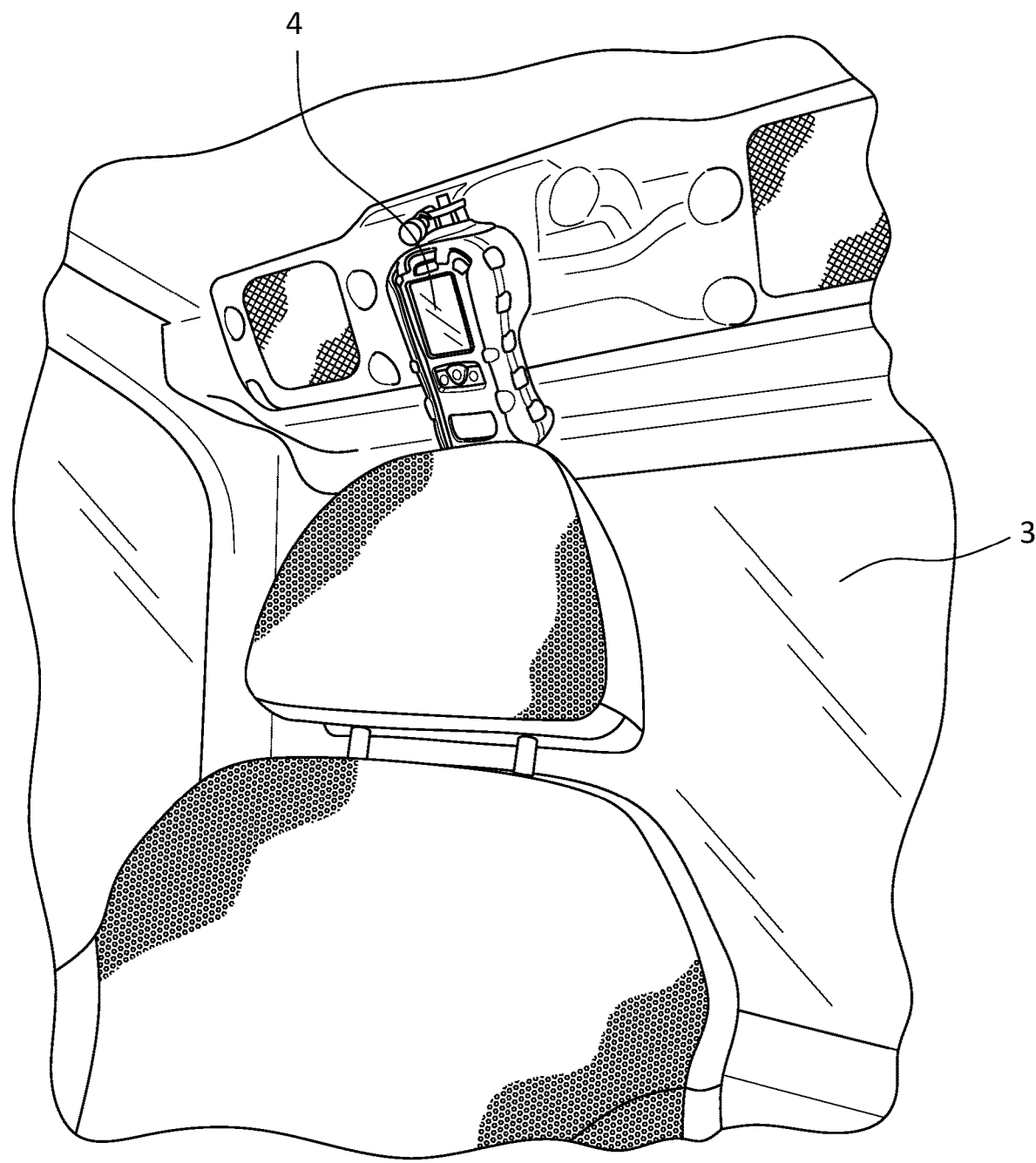
FIG. 1B shows an air monitor disposed inside a heavy equipment cab for monitoring of VOCs and flammability based on a percent of the LEL.
Figure 1C:
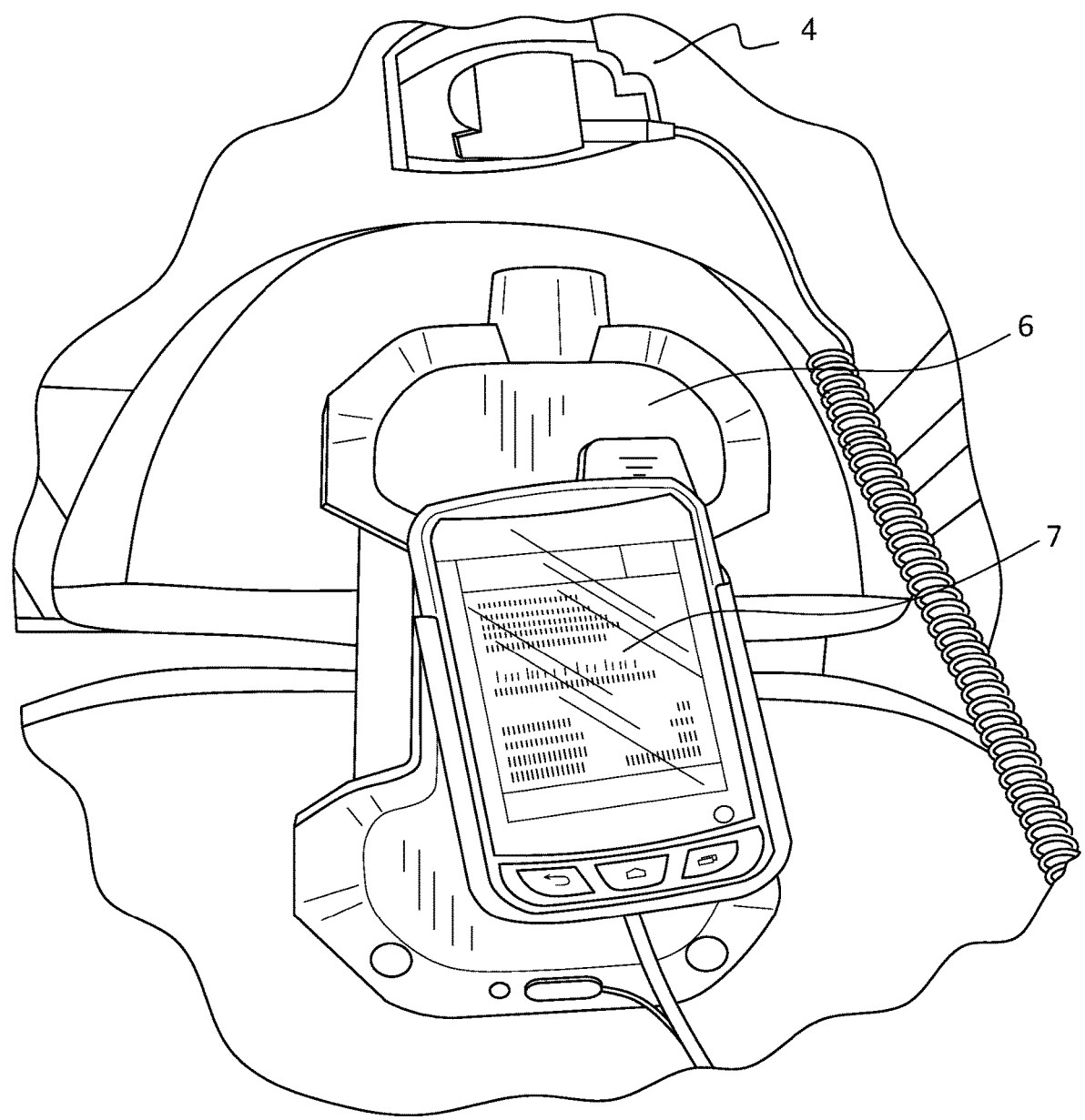
FIG. 1C shows a gas sensor and a control unit placed inside the heavy equipment cab.
Figure 2A:
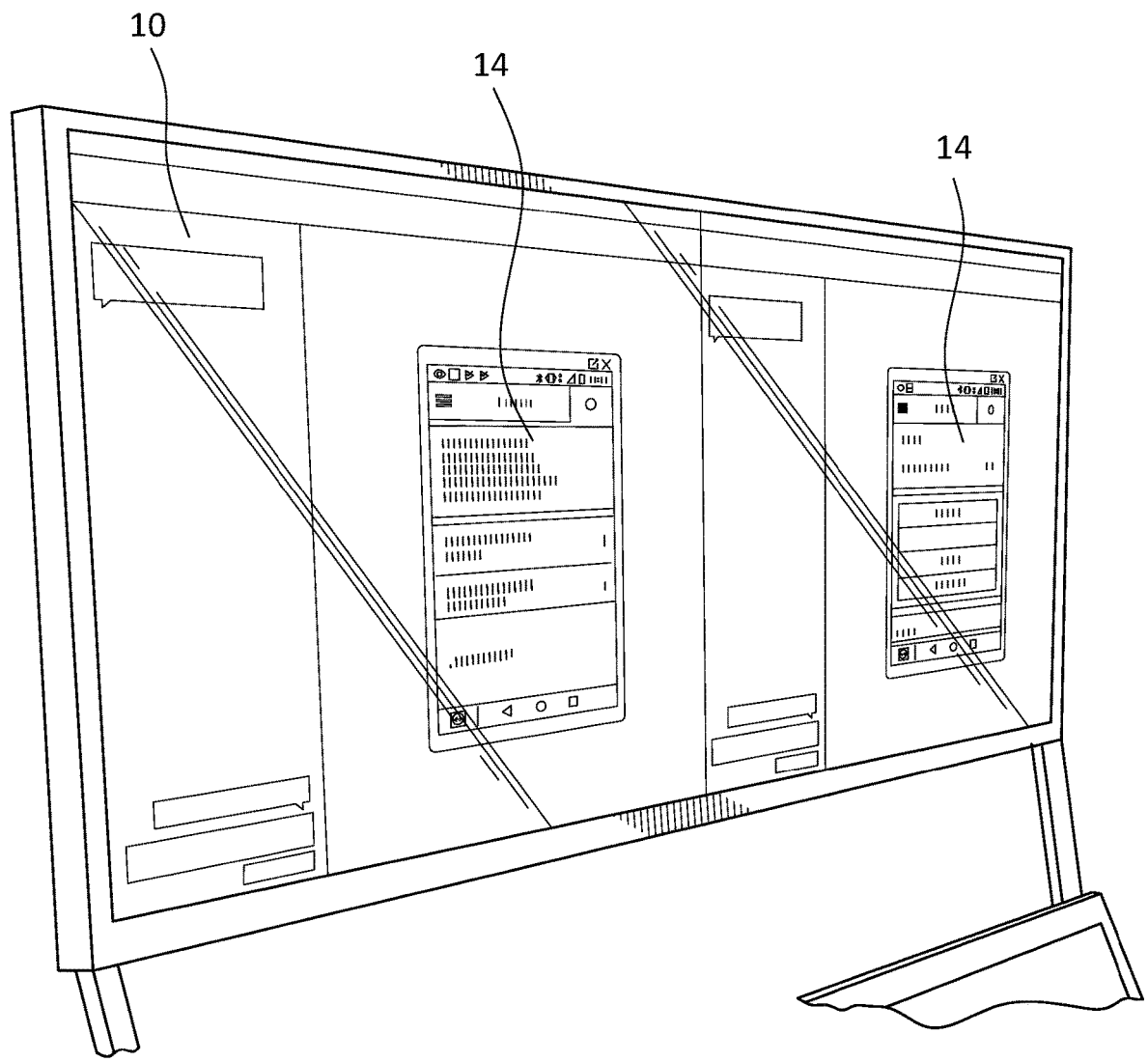
FIG. 2A is a view of the host computer monitor showing the control units of the respective gas sensors connected to a host computer via a remote-control software.
Figure 2B:
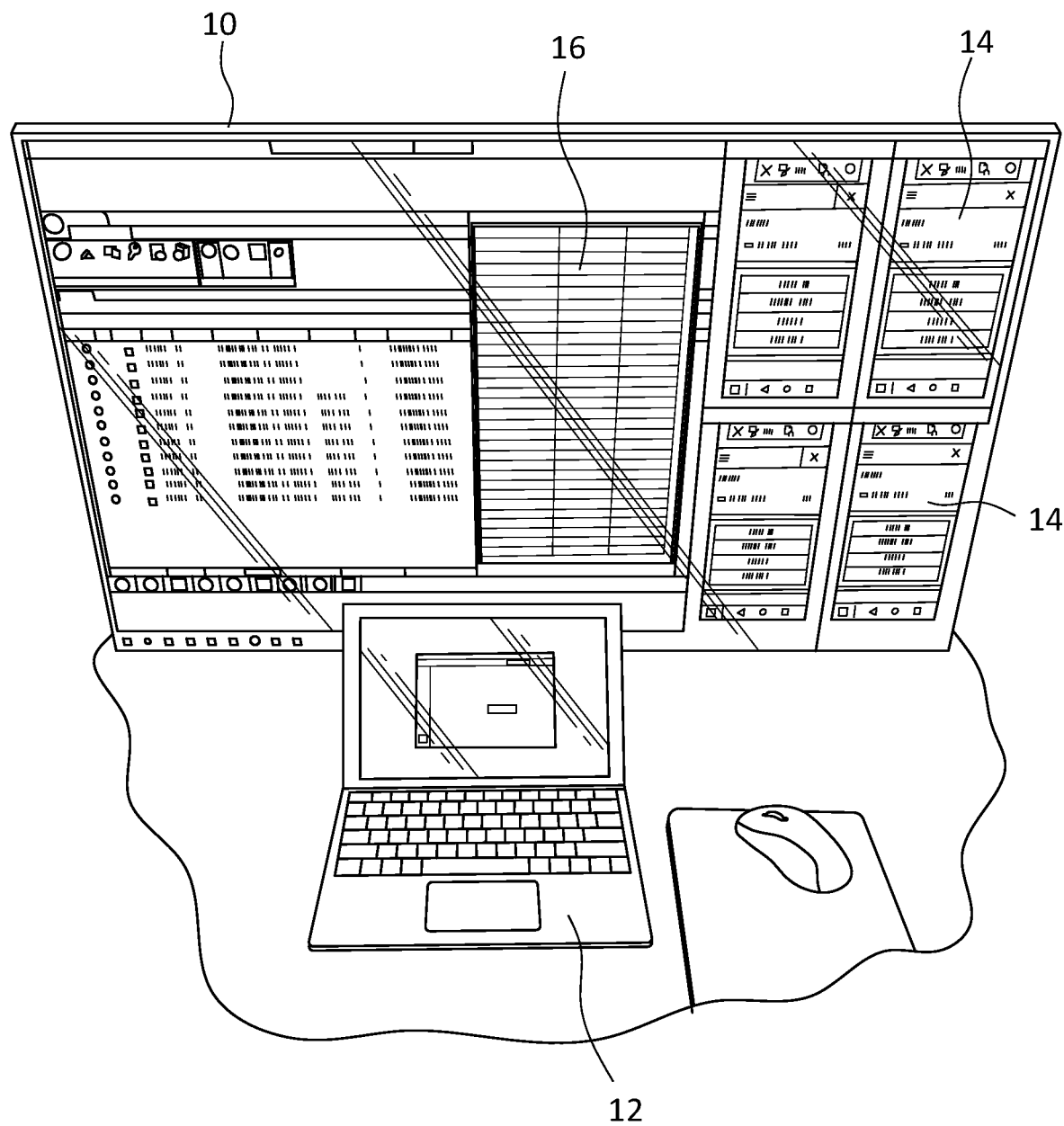
FIG. 2B is a view of the computer monitor showing an output from one of the air monitors. Four control units for the respective gas sensors are also shown.

FIGS. 1A, 1B, & 1C show the initial deployment of the present invention and FIGS. 2A & 2B show the remote technology involved on the computer screens within the command trailer as chemical specific exposure is monitored and communicated directly to the operators. This type of data collection creates a feedback loop for chemical-specific data for isolated work operations. The present invention establishes situational awareness and effective communication through team roles as 1.) Dispatch, collection of data and direct communication, 2.) Lead Industrial Hygienist as HazMat Specialist and Sentinel Protocol supervision, 3.) Isolated HAZMAT Operator, 4.) Command Staff representation, as the Safety Officer for data and information to flow up the chain of command.

The air monitoring data is collected through a remote application platform with a wide range of data collection for isolated workers. The following provides an example with isolated HAZMAT workers operating heavy machinery; it involves RAE Systems devices and technology; namely, AreaRAE and MultiRAE Pro devices, remote data collection for both VOCs and flammability based on a percent of the lower explosive limit (LEL), via ProRAE Guardian software.

Referring to FIG. 1A, an air monitor 2 is attached to the exterior of a heavy machinery, such as a crane, excavator, etc., for sentinel alarm of VOC and LEL detection. The air monitor 2 is preferably a device called AreaRAE made by the RAE Systems using remote technology with built in radiofrequency (RF) modems to connect to a host computer wirelessly using a communication software called the RAE Systems ProRAE Guardian, made by the RAE Systems. The ProRAE Guardian software connects the air monitor 2 through a mesh network back to a host computer 12 in a remote location, such as a field command trailer, allowing the user to view data remotely from the air monitor 2 in real-time. The air monitor 2 is monitored wirelessly in real-time for VOCs and LEL data.

The air monitor 2 (5-gas AreaRAE) is used as a tip-of-the-tool approach to identify potential for changes in atmospheric conditions involving; 1.) flammability based on a percent of the lower explosive limit (LEL); 2.) Oxygen, percent by volume; 3.) volatile organic compounds (VOCs). Typically in use, but not limited to ambient air outside of the operator's equipment cab for remediation or investigation of contamination. The air monitor 2 is the first layer of exposure protection by being prepared to see outside vapor has the potential to migrate inside the operator's cab. Also, the air monitor 2 is a first layer of protection for any flammability potential, so action can be taken to control the emissions.

Referring to FIG. 1B, an air monitor 4 is disposed inside the cab 3 of the heavy machinery shown in FIG. 1A, overhead within the worker's beathing zone. The air monitor 4 is monitored wirelessly in real-time for VOCs and LEL data inside the cab via the ProRAE Guardian system. The air monitor 4 is a 5-gas monitor, preferably a device called the MultiRAE made by the RAE Systems. The ProRAE Guardian software connects the air monitor 4 through a mesh network back to the host computer 12 located in the field command trailer, allowing the user to view data remotely from the air monitor 4 in real-time.

The air monitor 4 (5-gas MultiRAE) is used as an isolated worker exposure tool to identify potential for changes in atmospheric conditions inside the operator's cab involving; 1.) flammability based on a percent of the lower explosive limit (LEL); 2.) Oxygen, percent by volume; 3.) volatile organic compounds (VOCs). The air monitor 4 is a secondary identification of potential for vapor migration from outside activities to then inside the confinement of the operator's equipment cab. The air monitor 4 is located within the breathing zone of the operator that is limited to the confines of the equipment cab. This supports the second layer of exposure protection, that leads right into the third layer of protection, by taking measurements with more advanced technology of gas chromatography and speciate the constituents of VOCs.

Referring to FIG. 1C, a gas sensor 6 is disposed inside the cab 3 of the heavy machinery shown in FIG. 1A. The gas sensor 6 is preferably a device called Dräger X-Pid® 8500/9500, made by Drägerwerk AG & Co. KgaA. The gas sensor 6 is used to speciate hydrocarbons inside the cab 3. Data for BTEX+hexane+1,3 butadiene is collected by the gas sensor 6, and remotely wirelessly transmitted to the command trailer, where the data is monitored. The gas sensor 6 is a real-time gas chromatograph and a photo-ionization device that transmits its measurement data to a control unit 7 via Bluetooth (registered mark). The gas sensor 6 performs gas chromatography and photo-ionization detection in real-time.

The Dräger X-Pid® 8500/9500 (XPID) is an instrument with the capability to monitor in real-time for up to 46 chemical compounds. The chemical is identified by retention time via gas chromatography (GC) analyzer and then provides a measured concentration readout via photo-ionization detector (PID). The XPID is disposed inside the operator's cab, within the breathing zone of the worker, and operated remotely for real-time data collection and operational communication. Real-time action level exceedances are based on chemical specific OELs provided by the units 2 and 4.

The control unit 7 is a handheld mobile data device, essentially an intrinsically safe Android smartphone. With a SIM card or Wi-Fi connection, the control unit 7 can operate just like any other smartphone in the market. The unit 7 comes with a mobile app that connects to the gas sensor 6 via Bluetooth connection. The control unit 7 enables control of the gas sensor 6 and evaluation of the received measurement data. The unit 7 is wirelessly connected to the host computer 12 with a remote device control software, such as the TeamViewer app. The unit 7 is also made by the Drägerwerk AG & Co. KgaA.

Remote GC measurements allow us to speciate the VOCs and provide chemical-specific data communication to field technicians and operator performing the remediation operation. This chemical-specific data in real-time allows us to better control exposure to the operator and other workers in the surrounding areas. If the TLV-TWA/STEL action-level of a specific chemical is approaching, work controls can be implemented and work continued to keep the worker from experiencing chemical exposure. If an action level is exceeded for either 8 hr TWA or 15 min STEL, immediate action can be taken to stop work. Definition of Threshold Limit Value (TLV), Time-Weighted Average (TWA), and Short-Term Exposure Limit (STEL) may be found in the link: ACGIH TLV_TWA_STEL Introduction.

The control unit 7 transmits the results of the gas chromatography and photo-ionization detection in real-time to the remote location and communicated to the isolated worker for data transparency and worker comfort during times of non-detects and/or low-level detections, and always during action level exceedances for work control implementation and safety of operators and surrounding work areas.

Referring to FIG. 2A, a computer monitor 10 is disposed inside the command trailer, which is remote from the air sensors 2, 4, the gas sensor 6 and its control unit 7. Views 14 displays two control units 7 monitoring for chemicals inside multiple the cabs. The control units 7 are connected to the host computer 12 running the TeamViewer remote device control software. The control units 7 are remotely controlled by the host computer 12 via the TeamViewer application to activate the respective gas sensor 6.

Referring to FIG. 2B, the computer 12 is shown connected to the monitor 10 inside the command trailer. Four views 14 of four control units 7 are shown. Several air monitors 2 (outside the cab 3, stations 14) and 4 are operably wirelessly connected to the computer 12. Data from one of the air monitors is displayed in view 16, which shows time of day in the first column, % LEL in the second column and VOC ppm in the third column. The air monitors 2 and 4 are operably wirelessly connected to the host computer 12 running the ProRAE Guardian application. Each of the views 14 is used to control the corresponding control unit 7 and the associated gas sensor 6 to perform gas chromatography and photoionization detection remotely in real-time for specific BTEX. Once an increase in VOCs inside 1 of the 4 cabs or a monitoring station 14 (see FIG. 6) is seen, a benzene, toluene, ethyl-benzene, xylenes (BTEX) sample on the X-pid 6 is run remotely and viewed in real-time the BTEX data and then communicated those detections back to the operators for safety recommendations of personnel.

Figure 3:
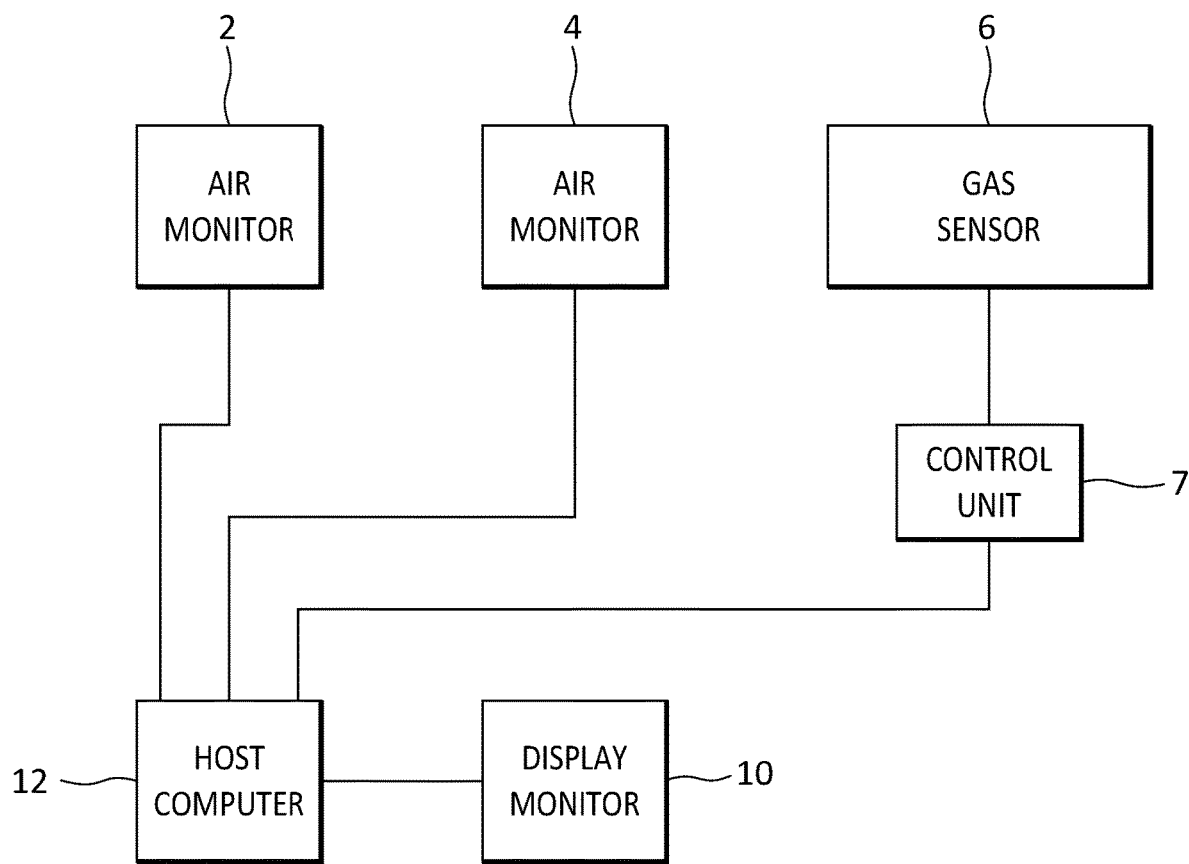
FIG. 3 is a block diagram of a system embodying the present invention.

Referring to FIG. 3, a functional block diagram of the system embodying the present invention is disclosed. The air monitors 2 and 4 are operably connected to the remote host computer 12 via wireless connections. The gas sensor 6 is operably connected to the control unit 7 via Bluetooth. The control unit 7 is operably wirelessly connected to the host computer 12 via cell phone technology and the TeamViewer app to allow remote control of the gas sensor 6 from the host computer 12.

Figure 4:
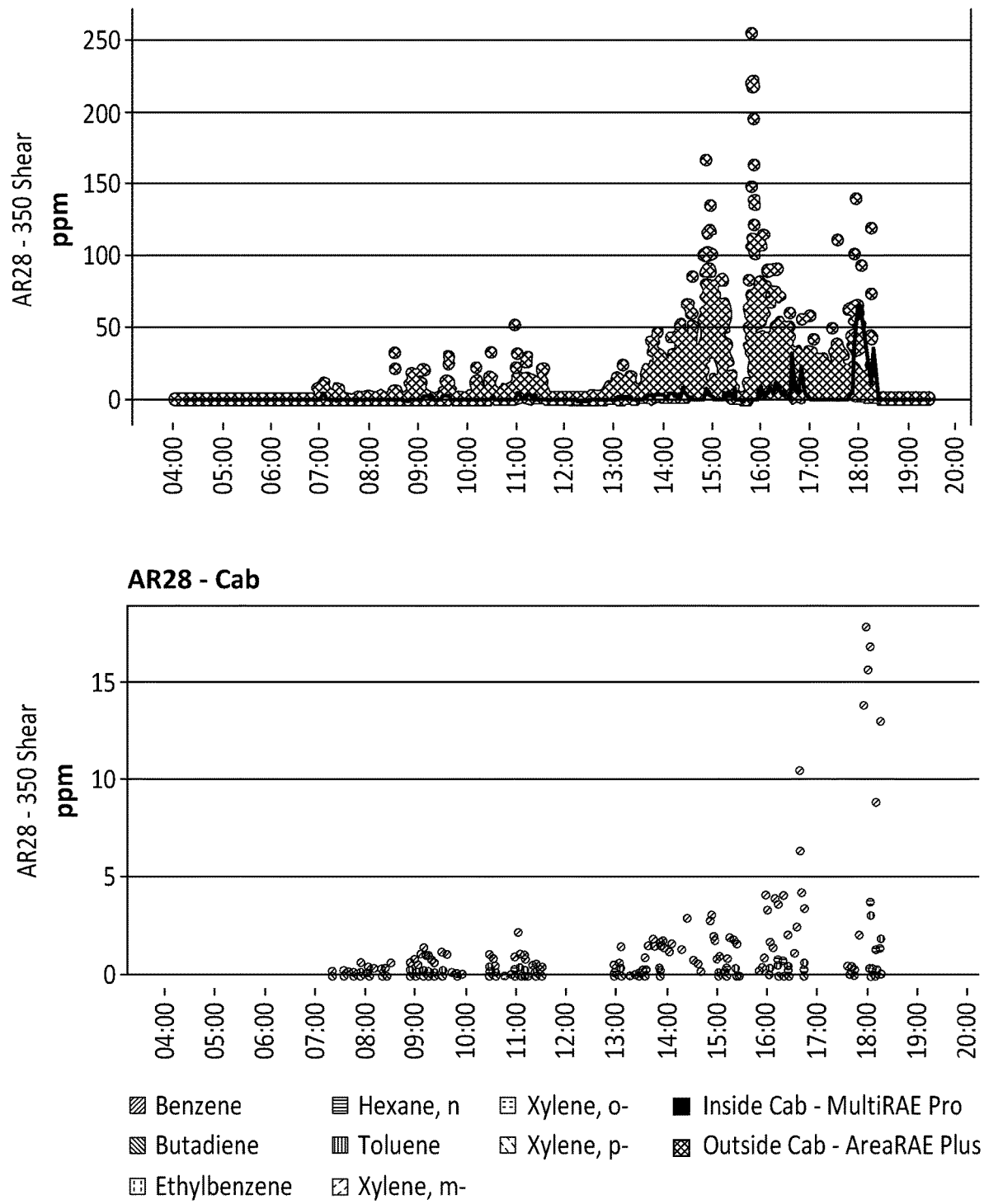
FIG. 4 is a Benzene Trend Graph as compared to VOCs (inside and outside the operator's cab).

FIG. 4 shows a trend graph example of benzene as the chemical of concern in the spikes of VOCs (inside and outside the operator's cab). The graphs show a preliminary remote-telemetered real-time monitoring (Comparative VOC Monitoring/Deconstruction Equipment).

Figure 5:
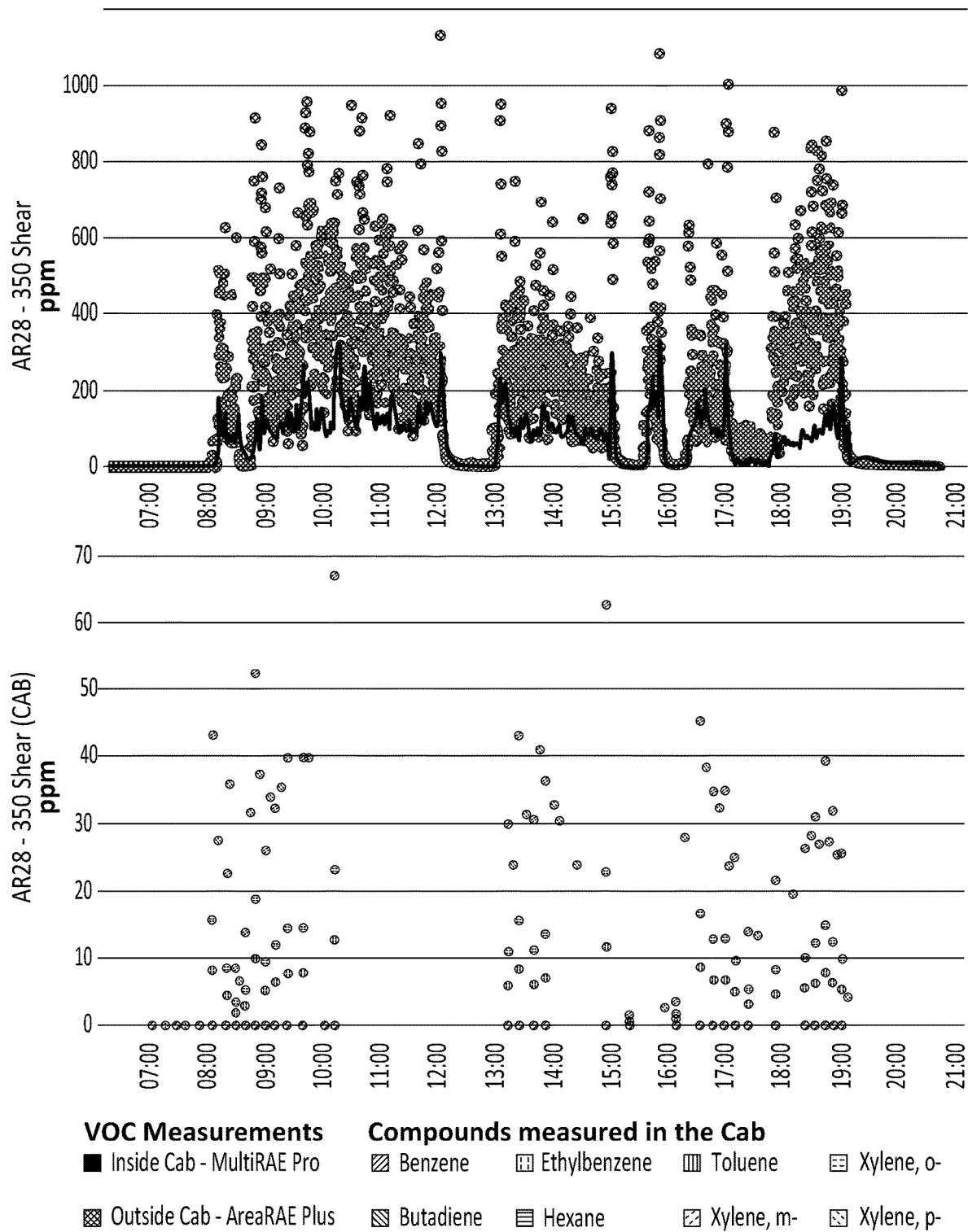
FIG. 5 is a Xylene Trend Graph as compared to VOCs (inside and outside the operator's cab).

FIG. 5 shows a trend graph example of xylene as the chemical of concern in the spikes of VOCs (inside and outside the operator's cab), as the operator was working in very close proximity as the previous FIG. 4 with benzene as the chemical of concern. The graphs show preliminary remote-telemetered real-time air monitoring (Comparative VOC Monitoring/Deconstruction Equipment).

Figure 6:
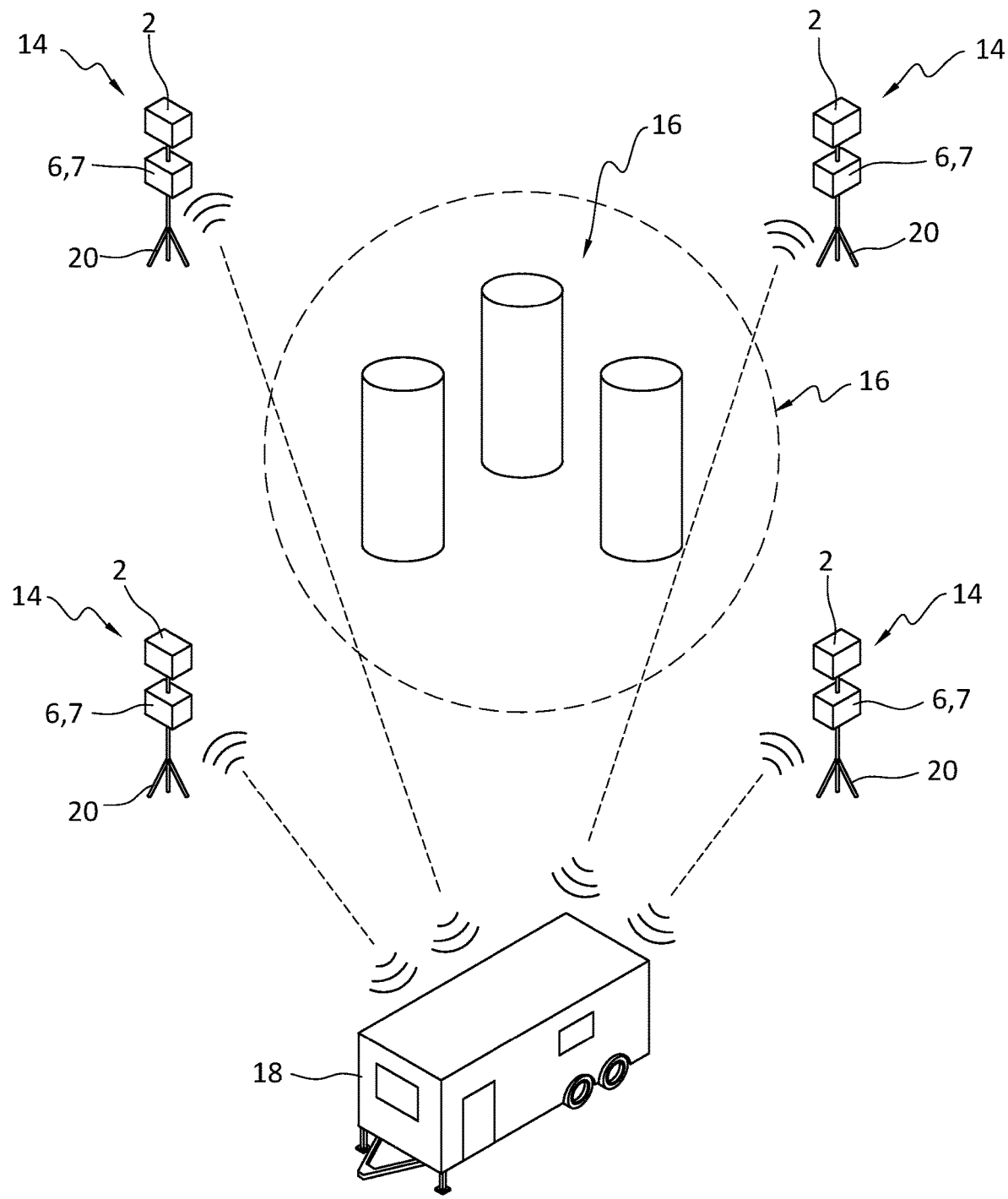
FIG. 6 is a schematic diagram showing a plurality of air monitoring stations defining a virtual fence disposed around a source generating a hazardous chemical environment.

Referring to FIG. 6, a plurality of air monitoring stations 14 disposed around a source 16 generating a hazardous chemical environment. The air monitoring stations 14 define a virtual perimeter fence 16. Each station 14 includes an air monitor 2 and a gas sensor 6 with its control unit 7, operably connected wirelessly to a host computer 12 with a display monitor 10 in a remote location, such as a command trailer 18 (see also FIG. 3). Each station 14 may include a tripod 20 supporting the respective air monitors 2 and the gas sensors 6 at a height representative of the breathing zone of a worker. An AreaRAE device is preferably used for each of the air monitors 2 for levels of VOC, LEL and oxygen. A Dräger X-Pid® 8500/9500 is preferably used for each of the gas sensors 6 and the control units 7 for chemical-specific 1,3 butadiene monitoring. When elevated levels of VOCs are detected, immediately chemical-specific 1,3 butadiene data is collected to confirm values. This data allowed a hot-zone perimeter 16 to be maintained based on occupational exposure and actual data, as opposed to previous models that may be based on estimations.

The system of FIG. 6 advantageously allows for the responsible party to detect leaks and mitigate them immediately with strike teams at the ready for mitigation efforts.

The virtual fence 16 provided by the air monitoring stations 14 advantageously protects the isolated workers entering hot/warm zones by delineating the source of a product release; and it allowed for command staff to make informed decisions on right-sizing of the hot zone during the multiple phases of the response. Deployment of the chemical-specific monitoring equipment at these stations 14 were strategically located between the product source and the team's making entry into potentially unknown and unstable environments. The communication combination of wind direction, VOC data, LEL data, and chemical-specific action level detections at these stationary monitoring locations allows the isolated workers to make better-informed decisions on operational workflow, donning/doffing of PPE, and egress, if needed. Chemical-specific stationary monitoring was found to provide a "safety-net" by creating an air monitoring sentinel alarm barrier for workers that had to perform task-specific operations in hot/warm zones during instability of a large product source. Eventually, the present invention of air monitoring proved helpful for leak identification and tracking leaks in this unstable environment. These data allowed for those leaks to be identified, investigated, and mitigated more efficiently.

The virtual fence 16 advantageously allows unified command (UC), composed of federal, state, and local regulators and stakeholders, to allow the responsible party (RP) to move out of an ER phase and into a project remediation phase. This system created quick identification and notification for teams entering an expanded hot zone for investigational purposes. By keeping OSHA, CSB, insurance, and litigation investigational teams informed and safe during hot zone entry in appropriate PPE, the system advantageously provides a process which is much more efficient and controlled.

While the present invention is disclosed in the context of monitoring an isolated worker in an operator equipment cab, it should be understood that the invention is equally applicable to any confined space and/or any independent work area, such as any indoor space, a control room, an enclosure, a defined area in an open yard, etc., for the remote collection of both VOCs and chemical-specific data in real-time for exposure and hazard communication to the isolated workers that are confined to these work areas involved with these hazards; i.e., remediation activities and operators isolated and confined within their equipment cabs, operators confined to control rooms for ongoing operations that may be impacted by the chemical hazards, workers entering a hot zone for source investigation and identification of chemical-specific hazards involved in released mixtures, isolated workers confined to a work area station downwind/crosswind from source release, etc.

The present invention is a remote data collection and communication platform that bridges an information gap and creates safer working operations for workers in hazardous, yet also isolated environments. Using gas chromatography, the Dräger X-Pid® 8500/9500 (gas sensor 6) has the capability to monitor up to 46 chemical constituents in real-time. With the application of this new technique, we have demonstrated that this instrument can be operated remotely, and therefore lab quality exposure data can be communicated to isolated workers in real-time. We expect the present invention will create safer working environments, improve and enhance operational workflow, and allow HAZMAT operators to have more comfort and confidence in their ability to work in hazardous conditions.

The present invention of air monitoring strategy has been re-tested and re-evaluated for many deployments in many different emergency response (ER) scenarios, mostly concerned with protecting workers from chemical-specific exposure in real-time. The present invention has proven to be an effective tool for worker safety. Through the present invention, it has now become a very effective and powerful method to protect workers. The focus of the present invention is to prevent chemical exposure by providing a buddy system concept of protection for the lone worker or the isolated worker.

Occupations in the HAZMAT industry involve risk. Some of those risks we can mitigate with controls, both administrative and engineered, sometimes we are forced to resort to PPE. In the realm of skilled technicians that involve excavation and remediation techniques (OSHA, 29 CFR 1910.120-Hazardous waste operations and emergency response, 2019), an operator is isolated within their cab. Or maybe the HAZWOPER responding strike team need to make a hot zone entry, without information. We are forced to rely on PPE and the buddy system may not be up to standard, as noted in the HAZWOPER standard CFR 1910.120 (q) (4), skilled support personnel and the buddy system requirements (OSHA, 29 CFR 1910.120-Hazardous waste operations and emergency response, 2019). These are only two examples of isolated workers, yet there are so many more work activities that take place every day with isolated work activities. Example of excavation activities at a pipeline release where each operator is at risk for exposure inside each heavy machinery cab as they will become isolated in the nature of the response activities.

A problem encountered for HAZMAT isolated work activities is that they may have to rely on limited air quality data to make both operational decisions and decisions on personal protective equipment (PPE). The ability to collect and communicate more accurate data to isolated workers in real-time, as provided by the present invention, has been a proven solution to workers previously being forced to rely on PPE, as we have better quality information on exposure potential. By providing real-time chemical-specific data from instrumentation monitoring ambient air environments involving product mixtures, the command staff (i.e., Safety Officer and Operations Section Chief) and the HAZMAT operations field deputy acting as site supervision can make better informed-decisions on operational tactics and the PPE designated for the isolated worker based on the tactics moving forward.

The method of the present invention involves communication of remote technology for chemical-specific air monitoring, provides OSHA compliance with HAZWOPER standard CFR 1910.120, provides more efficiency, and also provides a safer working environment for isolated workers than any other current exposure monitoring options. Through a qualitative survey method with isolated workers receiving real-time communication of chemical-specific data and action levels, the quantitative method of the present invention also provides more confidence and more accurate prescription of PPE allowing for safer work practices. This information advantageously influences operational workflow and allows isolated workers to feel more comfortable in their hazardous surroundings.

The present invention provides a system and method of safe working practices for unknown hazardous conditions that workers may encounter during large-scale emergency response efforts. The present invention uses a combination of sampling instrumentation and location. These were developed with consideration towards flammable atmospheres, worker exposure, and a singular form of communication. Flammable atmosphere potential was closely watched through the ProRAE Guardian software via LEL and oxygen sensor data provided by the air monitors 2 and 4. The matter of watching and collecting exposure data was a new concept. The X-pid (sensor 6) is an extremely useful piece of equipment for worker exposure monitoring, and the utilization of this equipment in a remote fashion according to the present invention provided an increased level of worker protection.

The X-pid (sensor 6) consists of a gas sensor containing a gas chromatograph (GC) and photo-ionization detector (PID) combined into one unit for chemical mixture separation within the GC and a direct-read from the PID for chemical concentration. The gas sensor is controlled by a control unit 7, which is a handheld mobile data device, essentially an intrinsically safe smartphone. The control unit 7 comes with a mobile app that connects to the gas sensor via Bluetooth connection. When the two are separated by more than 10-15 meters, they lose connection and must be rejoined to reconnect. With a SIM card or Wi-Fi connection, this smartphone can operate just like any other smartphone in the market.

An application platform, called TeamViewer, that (with Wi-Fi or cellular service) can be operated from a remote setting. The TeamViewer software allows for remote device control, typically used in an IT setting for remote support and collaboration. This solution allowed us to keep the X-pid equipment together and operate the connected GC sensor from a remote location (i.e., job trailer onsite, office, home, etc.) with a Wi-Fi connection. Thus, in the initial application, this allowed us to see both VOCs and what those VOCs consisted of inside the HAZMAT operator's equipment cab. The analytical sampling media collected from the operators provided confirmation data that could be compared after laboratory analysis at a later date.

The present invention provides a safety communication system that provides means to communicate critical information to Command Staff, HAZMAT supervisors, and isolated workers.

Prior to the type of data collection and technology of the present invention, the industrial hygienist would not know whether the isolated worker was experiencing exposure to benzene (TLV-TWA=0.5 ppm) or to xylene (TLV-TWA=100 ppm), when VOCs are elevated inside the cab ranging from 50-300 ppm at any given work task.

Initial data collected in the first few months of the genesis of the Sentinel Protocol can be viewed in Table 1.

Real-time communication with operators of exposure potential and action level exceedances, donning/doffing APR-PPE, integral involvement and mesh of communication of safety, operations, and command staff are outlined in a standard operating procedure embodying the present invention.

| Remote BTEX Monitoring | |
|---|---|
| Analyte | Count of Readings |
| Benzene | 12,063 |
| Butadiene | 11,271 |
| Ethylbenzene | 11,081 |
| Hexane | 11,213 |
| Toluene | 11,178 |
| Xylene, m- | 5,176 |
| Xylene, o- | 5,159 |
| Xylene, p- | 6,942 |
| Grand Total | 74,084 |

Table 1: Case study data collected within the first few weeks of the origin of invention.

Case Study: Conceptual Data Collection and Development

Value of data collection and communication of remote data; creating a virtual fence or perimeter for a hot-zone, can be monitored and right-sized as applicable, constantly evaluating VOC emission sources (p. 3) (Manes, Collodi, Fusco, Gelpi, & Manes, 2012). This virtual fence concept was utilized with the Sentinel Protocol, specifically for 1, 3 butadiene following process unit explosion (CSB, Fires and Explosions at TPC Group Port Neches Operations Facility, 2020). Value of worker exposure data and the use of the Sentinel Protocol created during the demolition of the fifteen 80,000-barrel tanks involved in a large terminal facility fire (CSB, Storage Tank Fire at Intercontinental Terminals Company, LLC (ITC) Terminal: Factual Update, 2019).

Large-scale ERs have been proving grounds for the present invention. These case studies have proved that an ad-hoc conceptual idea to monitor chemicals remotely is possible.

The present invention (the Sentinel Protocol) is further disclosed in the following materials, showing that a standard operating procedure (SOP) for the Sentinel Protocol can be used on any incident and repeated for future use throughout the HazMat industry with any project. The Sentinel Protocol will also prove to be a better option for HAZWOPER compliance via the OSHA standard for the buddy system, thus allowing stronger communication and safer working environments for all employees.

The following materials will review and summarize the methods and the results of the extensive quantitative sampling effort through some case-study evaluations (CSB, Storage Tank Fire at Intercontinental Terminals Company, LLC (ITC) Terminal: Factual Update, 2019) (CSB, Fires and Explosions at TPC Group Port Neches Operations Facility, 2020). Future research will support and summarize results through a qualitative sampling effort via survey technique that will allow HAZMAT operators and isolated workers an opportunity to project how the Sentinel Protocol affected their operational workflow, if at all, and may have also provided a n added layer of protection, sense of comfort, and confidence in safe-working conditions during chemical remediation operations.

Methodology

In order to better understand the exposure potential of isolated workers in the HAZMAT industry, a hygienist must evaluate each unique situation and determine the best platform to obtain data. The Methods section is broken down into two general subsections: 1.) separate case studies of how data was initially collected and interpreted, then how it was initially communicated to protect the workers; 2.) an analysis of how the Sentinel Protocol was initially used, lessons learned both quantitively and qualitatively through survey, and then the developed into the Sentinel Protocol standard operating procedure (SOP), supporting a new gold-standard in exposure science within the industry. With the combined use of photo-ionization detectors (PID), gas chromatography (GC), analytical passive dosimeter badges, this allows industrial hygienists the ability to have a better understanding and a novel approach to protecting these workers via the Sentinel Protocol. This protocol offers protection to isolated workers that in the past have had limited access to information and limitations to the HAZWOPER safety and communication standard for the buddy system.

The following sections will explain the equipment and protocols used in each case study and how the data was collected.

Sampling Equipment

RAE Systems 5-gas monitors (air monitors 2 and 4) were utilized for this dataset, specifically the MultiRAE Pro (RAE Systems, MultiRAE Series User's Guide, 2017, hereby incorporated by reference) for the air monitor 4 and the AreaRAE Plus (RAE Systems, AreaRAE Plus & AreaRAE Pro User's Guide, 2017, hereby incorporated by reference) for the air monitor 2. These instruments were selected primarily because of the remote monitoring technology, ProRAE Guardian, that connects their instrumentation through a mesh network back to a host computer allowing the user to view data in real-time. For this study, the parameters were set to view data streaming in every 15-seconds (RAE, ProRAE Guardian User's Guide, 2015, hereby incorporated by reference). Each instrument uses a PID for monitoring VOCs, LEL sensor for monitoring the potential for flammable atmospheres by measuring a percentage of the lower explosive limit (LEL), and an oxygen sensor to monitor the potential for oxygen displacement by measuring percent oxygen calibrated at the standard ambient air percentage of 20.9%. Each instrument also has capability to deploy 2 additional substance-specific sensors, for example hydrogen sulfide and carbon monoxide could be installed.

Dräger X-pid 8500/9500 for the gas sensor 6 was selected for this method of sampling for its handheld gas chromatography (GC) capability to speciate VOCs into benzene, toluene, ethyl-benzene, xylenes (BTEX), n-hexane, and 1,3 butadiene. These analytes were selected for measurement due to the constituents of the products that were released in each ER case study example. Please see Table 2 for the published list of 41 target compounds that can be analyzed by the X-pid; now offering 46 target analytes.

| 1,2-Dichloroethene (cis) | Acetic acid butyl ester | Ethylene oxide | Styrene |
| 1,2-Dichloroethene (trans) | Acetone | Heptane | Tetrachloroethene |
| 1,2-Dimethylbenzene | Benzene | Hexane | Tetrahydrofuran |
| 1,3-Butadiene | Butanal | i-butene | Toluene |
| 1,3-Dimethylbenzene | Carbon disulfid | Methyl acrylate | Trichloroethene |
| 1,4-Dimethylbenzene | Chlorobenzene | Methyl bromide | Vinyl chloride |
| 2-Butanone | Cyclohexans | Methyl methacrylate | Vinylidene chloride |
| 2-Propanol | Epichlorohydrin | n-Butyl acrylate | Xylene, all isomers |
| 2-Propenal | Ethanol | n-Propanol | |
| 2-Propenoic acid ethvi ester | Ethyl acetate | Phosphine | |
| (2-Propyloxy)ethyl acetate | Ethyibenzene | Propviene oxide | |

Table 2: X-pid Target Compounds with links; this list is a living document and new chemicals are constantly being qualified by manufacturer. Current list is 46 chemicals found here: https://www.draeger.com/en-us_us/Products/X-pid-9000-9500

Analytical sampling was also performed in each application. Similar exposure groups (SEGs) were utilized for the response effort; however, only workers considered to be isolated for comparison analysis were considered. Worker data was collected for total response and worker exposure analysis; therefore, it was collected in more of a functional industrial hygiene SEG fashion and not collected for any experimental needs for this research. As such, analytical data was not collected on each worker for each day of activities. An Assay 566 organic vapor passive dosimeter monitor was deployed on the workers lapel (for breathing zone representation) at the start of each shift and then collected at the end of each shift and sent to the lab via chain of custody (COC) for analysis by an AIHA-accredited laboratory. Analysis could be run for BTEX, n-hexane, and 1,3 butadiene using this style of sampling media and later compared to the real-time dataset.

Case Studies

The Sentinel Protocol comes together (CSB, Storage Tank Fire at Intercontinental Terminals Company, LLC (ITC) Terminal: Factual Update, 2019). We took a standard method of exposure monitoring, made a slight improvement, and then incorporated a safety process. Prior to the safety briefing each day, all equipment is calibrated per the manufacturer's specifications and deployed into HAZMAT operator's equipment cabs. Each of the HAZMAT heavy equipment has a specific set of equipment: 1 AreaRAE, 1 MultiRAE, 1 X-pid. The AreaRAE is deployed outside of the operators' cab as a measure of ambient air quality outside. The AreaRAE plays two roles: 1.) it provides real-time information on flammability and the potential for flash fire during product recovery, and 2.) it provides an elevated VOC preventative measure or a "trigger" for the industrial hygienist (viewing the remote data) to be prepared for migrating vapors in the cab. This corresponds directly with the MultiRAE Pro placed inside the cab (overhead, within workers breathing zone). This trigger of high VOCs outside the cab leads to closely watching the VOCs inside the cab. The Dräger X-pid is attached to the back of the operator's headrest inside the cab. Once the trigger of VOC detection occurs and there has been breakthrough inside the cab, the IH is triggered to run a BTEX sample with the X-pid. Within 60-90 seconds we have results broken down in chemical-specific concentrations of the BTEX constituents that compose the VOCs found inside the cab. Data collection via the X-pid should not be limited to only VOC detections, collection of non-detects (or chemical-specific data below the instrument's limit of detection) is an equally powerful dataset that can display there was no exposure; especially if odor thresholds may prove to present themselves well below action levels and/or instrument limits of detection (i.e., ppb or ppt odor threshold, similar to mercaptans or acrylates). These data will support that having odor does not equate to an acute/chronic exposure that can cause health-related conditions, rather, displaying that although odor may still cause individualized transient symptoms at very low levels, the dataset is backed by science. It's best practice to always be collecting data in time increments that are attainable by the individual or process.

From this point, communication is the key component of the Sentinel Protocol. In each day's safety briefing, BTEX action levels are communicated and the action to be taken if levels are exceeded and sustained. The "dispatch" position, as described in (Roth, Multer, & Raslear, 2006), is one of the most important and dependable roles within the Sentinel Protocol. Communication is the key to success and having someone in a role that can immediately communicate air monitoring data to the operator so that we can understand what task was being performed for this action level exceedance to occur. A peak value exceeding action levels doesn't immediately mean an exposure has occurred, but it does give the team a chance to pause, reassess the work operation, and determine if there is an alternative way of approaching the operation that can be performed safely, or if we must don respiratory protection to accomplish the task at hand. The action level exceedance, the field communication, and the next operational approach are then immediately communicated to the command staff for approval. The expectations are that this method safely allows operations to continue without exposure and less interruption of operational workflow.

The Sentinel Protocol comes together for another largescale emergency response (CSB, Fires and Explosions at TPC Group Port Neches Operations Facility, 2020). We took a standard method of perimeter monitoring, made a slight improvement, and then incorporated a safety process. Prior to the safety briefing, all equipment were calibrated per the manufacture's specifications, then deployed and maintained daily for 24-hour operations. This 24-hour perimeter monitoring continued for approximately 7-8 months throughout the response. The perimeter monitoring stations included, but were not limited to, a tripod host that was supporting a breathing zone representation of an AreaRAE (LEL, VOC, and oxygen monitoring) and a co-located Dräger X-pid for chemical-specific 1,3 butadiene monitoring. Similarly, the process noted AreaRAE elevated VOC detections and immediately warranted chemical-specific 1,3 butadiene data to be collected to confirm values. This data allowed a hot-zone perimeter to be maintained based on occupational exposure and data-driven, as opposed to previous models that may be based on estimations.

This model also allowed for the responsible party to detect leaks and mitigate them immediately with strike teams at the ready for mitigation efforts. We expect that this real-time chemical-specific modeling ultimately allowed for the responsible party to move from emergency response phase to project phase more quickly than previously thought and utilized as a survey method. This method was also expected to protect outside agencies during their investigative visits and data collection.

Sample Collection Limitations

Limitations and workarounds are inevitable in every project to learn key components that allow for innovation. In the first case study (CSB, Storage Tank Fire at Intercontinental Terminals Company, LLC (ITC) Terminal: Factual Update, 2019) involving cab interior monitoring, there were limitations. However, with no active night operations a team could support equipment maintenance (i.e., charging, calibrations, changing water traps, cleaning lamps, replacing sensors, and other general maintenance) after hours. Normally, the Dräger X-pid has a 4-6-hour battery life; therefore, the instrument must remain on charge inside the cab of the heavy equipment throughout the shift. For intrinsic safety purposes the chargers connect via magnets, sometimes the cables would disconnect due to rough or jarring conditions. The cables could also collect small metal debris over time and create poor charging connections due to the magnetism.

Another limitation is temperature. The X-pid has optimal operating temperatures for the GC column. For safety reasons and self-preservation of the gas column, the instrument will go into temperature stabilization mode to protect the GC column at temperatures greater than 104° F. (Dräger, 2021). This limitation becomes problematic in climates with elevated temperatures. In the summertime heat in southeast Texas, even inside an air-conditioned cab we had to find solutions to keep the instrument climate-controlled to continue data collection. This allowed for breathing zone representation.

In the second case study (CSB, Fires and Explosions at TPC Group Port Neches Operations Facility, 2020) we experienced the same limitations with the X-pid. This included a different scenario using the instrument as a fixed station; therefore, it required alternative solutions. The X-pid required protection from all the outside elements of weather (i.e., rain, sun, heat, etc.). The X-pid also required a power station as we were running them 24 hours a day for perimeter data collection. Since the field maintenance and calibrations took place in the field each day, we could have just swapped instruments at the end of the 4 to 6-hour battery life and we did in the beginning of the ER, yet we wanted consistency and not to mention manpower would have likely tripled to accomplish this with over a dozen perimeter monitoring locations. To start, weather tight pelican cases were the first choice to protect the instruments, but then temperatures warmed up outside and the instrument would enter into temperature stabilization mode within the case (especially with the radiant heat from the sun bearing down on the containers).

Rain and humidity created some limitations for the AreaRAE monitors that were exposed to the elements. Simple solutions involved large zip-loc bags that could be placed over the units with the air inlet sticking through the bag. Constantly checking and changing the water traps for both water and dust was also part of the typical daily maintenance with battery change and calibrations.

QA/QC Protocol

QAQC of instrumentation, part of the routine QAQC was to always verify detections with secondary and sometimes tertiary instrumentation. If there is a detection of any kind, the standard protocol is to verify and re-run a calibration on the instrument if it is not a true detection. Method testing and communication of the QAQC is typically field testing and field maintenance. The communication is to always document and to have verbal exchanges with teams in the field at all shift changes and/or as the scope of work changes.

Comparative analysis took place a few different ways, the constant comparison with analytical results from the worker exposure badges and grab sampling at the source with the instrument. When we first began using the X-pid, we wanted to test the results with some analytical data. A grab sample was collected as a source sample using an evacuated canister (mini-can). This sample was collected and sent to the lab for analysis, co-located at the time of the sample being collected was the X-pid running a test for BTEX. The results of the grab sample analysis and the instruments readings are in Table 3, below. This is just a preliminary comparative analysis and more tests in a controlled environment should take place.

|  | Grab Sample Analysis Results | Dräger X-pid |
|---|---|---|
| Benezene | 0.236 ppm | 0.3 ppm |
| Toluene | 1.130 ppm | 1.22 ppm |
| Ethylbenzene | 0.049 ppm | <1 ppm |
| m- & p- Xylene | 0.624 ppm | 1.29 ppm |

Table 3: Grab Sample Analysis Compared to X-Pid

Standard Operating Procedure

This SOP has been developed based on previous results of the Sentinel Protocol deployment and qualitative feedback from team members that have used the protocol in both tabletop exercise and actual HazMat response.

Data is collected and compared to analytical data from passive dosimeters versus data collected and compared to VOC and LEL data collected by RAE Systems technology. Trends from monitoring comparisons and noteworthy findings (i.e., understanding chemical mixtures and VOCs, understanding relevance and significance of having chemical-specific data when historically relied on VOCs and analytical data). See Table 1 for total data points collected from case study 1 broken down by chemical. See FIG. 4 for trend analysis chart example comparing VOC detections via AreaRAE and MultiRAE and BTEX+n-hexane analytes over the course of a single work shift.

Quantitatively, a real-time method of the present invention has been determined to be accurate and monitored remotely for BTEX or other chemical-specific constituents.

Qualitatively, a real-time method of the present invention has been determined to be accurate and monitored remotely for BTEX or other chemical-specific constituents.

The Sentinel Protocol and remote chemical-specific data collection has proven over many different response applications to be one of the safest courses of action to protect isolated workers performing tasks in unknown or unstable environments. During the first case study, we found isolated workers operating inside heavy machinery were found to have more confidence in their personal safety. This operator confidence in real-time chemical-specific data collection and communication also allowed for less operational interruption and better operational workflow. They were able to operate more efficiently with less PPE (e.g., full-face air-purifying respirators can fog up causing difficulty with fine motor skills and vision in a hazardous work environment).

During the second case study we found that the present invention was able to protect isolated workers entering hot/warm zones by delineating the source of a product release and creating air monitoring perimeter stations; and it allowed for command staff to make informed decisions on right-sizing of the hot zone during the multiple phases of the response. Deployment of the chemical-specific monitoring equipment at these stations were strategically located between the product source and the team's making entry into potentially unknown and unstable environments. The communication combination of wind direction, VOC data, LEL data, and chemical-specific action level detections at these stationary monitoring locations allows the isolated workers to make better-informed decisions on operational workflow, donning/doffing of PPE, and egress, if needed. Chemical-specific stationary monitoring was found to provide a "safety-net" by creating an air monitoring sentinel alarm barrier for workers that had to perform task-specific operations in hot/warm zones during instability of a large product source. Eventually, the present invention of air monitoring proved helpful for leak identification and tracking leaks in this unstable environment. These data allowed for those leaks to be identified, investigated, and mitigated more efficiently. This allowed unified command (UC), composed of federal, state, and local regulators and stakeholders, to allow the responsible party (RP) to move out of an ER phase and into a project remediation phase. This system created quick identification and notification for teams entering an expanded hot zone for investigational purposes. By keeping OSHA, CSB, insurance, and litigation investigational teams informed and safe during hot zone entry in appropriate PPE, we found this process to be much more efficient and controlled.

State and Federal agencies have been pushing towards lower detection limits for BTEX. Examples but not limited to: Colorado well-pad monitoring, pushing for 9 ppb benzene perimeter monitoring, California (OEHHA) pushing industry to hit 9 ppb benzene in community. Currently, perimeter monitoring stations in real-time could be a suitable alternative to and/or co-located with evacuated cannisters being sent to the lab for analysis in these situations, thus identifying in real-time a potential source for investigation and not merely a quantifiable number collected and averaged over a period of time.

The standard operating procedure (SOP) was created to outline procedures and appropriate applications for the Sentinel Protocol. It is intended this SOP will:

Provide the procedures to facilitate the collection of data that is consistent with the intent of a standardized quality manual for use of air monitoring equipment Outline proper set-up, maintenance, and documentation procedures.

Provide consistency in content, accuracy, timeliness, and style.

Provide for additional quality assurance/quality control (QA/QC) review to reduce the potential for errors.

Provide and require the use of standardized templates and procedures.

Define the roles of the

ER/IH Consultant—Sentinel Protocol Supervisor and IH Field Lead

Equipment operator—HazMat Operator and HAZWOPER Skilled Technician

Field Scientist—Dispatch Communication and Data Collection

Command Staff SOFR—Safety Officer for Chain of Command Support

Data Manager (DM)—Daily Reporting

Scope

This SOP details the processes and procedures to be implemented when using the Sentinel Protocol. The content of this document is intended to be used by the lead development team within the Toxicology Emergency Response Program (TERP) Department and others at Center for Toxicology and Environmental Health, LLC dba CTEH, LLC or any other entity either now existing or hereinafter organized that falls under the umbrella of CTEH Holdings, LLC. The process and procedures defined in this document are to be followed and implemented at all times when using this operation system. The purpose of this SOP is that it can be implemented and repeated per the HAZWOPER Standards, defined in OSHA's CFR 1910.120, on all HazMat operations in emergency response, recovery, and remediation.

Training Requirements

The Sentinel Protocol is a combination of platforms for communication of data across multiple computers. Operators should have full comprehension and experience with ProRAE Guardian and the monitoring units that radio-telemeter data to the program, the Dräger X-pid 8500/9500, as well as the TeamViewer and Zoom screen sharing platforms.

Health and Safety

The Dräger X-PID 9000/9500 and handheld (control unit) are intrinsically safe devices. Check the instrument and handheld housing for signs of wear or cracks prior to use in the field.

To reduce the risk of electrical shock, power off the sensor unit before opening and follow applicable precautions if external power source is used. Perform maintenance only in an area known to be non-hazardous. Calibrate the instrument in an open or ventilated environment.

Common computer ergonomics are to be followed when running the system. Ensure the screen and chair are adjusted to proper height and angle to ensure a healthy posture and to reduce glare. Background lighting should be used to reduce eye strain.

Additionally, when cleaning the lamp and/or the photoionization detector (PID) sensor, the user should wear gloves and take precautions to avoid direct contact with the methanol. Take care when handling lamps, as they can potentially lacerate skin.

Definitions

Gas sensor: The gas sensor is the Dräger X-pid 8500/9500 measurement technology that transmits measurement data via Bluetooth® 4.0. The sensor unit has a sample inlet with a dust trap at the front, a gas outlet (M5 thread) and a carrier gas inlet (M3 thread) at the rear near the charging port, a power/status button on the side, and houses the battery, pumps, carbon filter, gas chromatography column, and PID.

Control Unit: The control unit is an explosion-proof Android smartphone equipped with a mobile app that enables control of the sensor unit and evaluation of the received measurement data. Refer to Dräger X-pid 8500/9500 User Manual for detailed description principle of operation of X-pid.

Gas Chromatography (GC): a separation process which separates different molecules in gas or vapor mixtures. The sample is injected into a capillary, the column, with the help of a carrier gas (mobile phase). The physical interaction between the gas molecules and the specially coated inner walls (stationary phase) of the column means that different molecules take different amounts of time to pass through the column. Refer to Dräger X-pid 8500/9500 User Manual for detailed description principle of operation of X-pid.

Photo-ionization detector (PID): used in tandem with an electron voltage lamp to measure changes in current directly proportional to vapor or gas concentrations. Refer to RAE Systems User Manual for detailed description principle of operation with RAE Systems equipment.

Limit of Detection: Concentration from which a substance can be detected, i.e., from which the sensor (PID) issues a signal. The limit of detection (LOD) depends on the sensitivity of the sensor. The LOD applies to 100% sensitivity of the respective PID, a parameter that is determined during calibration and is displayed in the corresponding archive in the user interface of the control unit.

Limit of Quantification: Concentration from which a substance can be measured, i.e., from which the sensor (PID) issues a signal that is within the specification of the measurement device, in particular, with regard to precision. The limit of quantification (LOQ) depends on the sensitivity of the sensor. The LOQ applies to 100% sensitivity of the analysis PID, a parameter that is determined during calibration and is displayed in the corresponding archive in the user interface of the control unit. The LOQ is three times the LOD. Below these limits, signal rises ("peaks") in the chromatogram do not sufficiently stand out from the sensor noise.

Electron Volt (eV): A measurement unit of energy used for measuring ionization energy or ionization potential for specific compounds.

Ionization Energy: The amount of energy input required to ionize a compound. This value, measured in electron volts (eV), is unique to each compound. Refer to RAE Systems Technical Note TN-106: Guideline to PID Response, Chemical Ionization Energy, & 10.6 eV Lamp Correction Factors, incorporated herein by reference, for a list of ionization energies.

Lamp: the UV light source used to ionize molecules of a gas into positive and negative charged particles. The three most common lamp types are 9.8 eV, 10.6 eV, and 11.7 eV. This manual will refer to 10.6 eV lamps, unless otherwise noted. Refer to RAE Systems Technical Note TN-106: Guideline to PID Response, Chemical Ionization Energy, & 10.6 eV Lamp Correction Factors, incorporated herein by reference, for a list of ionization energies and correction factors.

Lower explosive limit (LEL): the minimum concentration, as a percentage, of a flammable gas; refer to RAE Systems Technical Note TN-156: LEL Sensor Information and Correction Factors, incorporated herein by reference, for the sensor principle of operation.

Volatile organic compounds (VOCs): any organic compound that participates in atmospheric photochemical reactions.

Water trap/Dust trap: a device attached to the pump inlet of an instrument that prevents liquids and excessive dusts from entering the sensor manifold.

Roles and Responsibilities

The following are some examples and responsibilities of personal, if applicable, employing the Sentinel Protocol.

ER/IH Consultant—Sentinel Protocol Supervisor-Overall supervision and advise the use of system, number, and placement of units, establishing action levels and actions to be taken, writing and reviewing data summaries. Direct communication to SOFR, Operator, Dispatch, and Data Management.

Equipment Operator—HAZWOPER Skilled Technician-Operates heavy machinery in hot zone and/or around hazardous materials. Typically, this worker is isolated when inside the cab of the machinery and the Sentinel Protocol supports the Buddy System of the Operator.

Field Scientists—Dispatch and Data Collection-Sets up equipment, communicates worker activity, assists in troubleshooting equipment, communicates action level exceedances and exceedances to workers, observes work patterns to predict exceedances, calibrates air monitoring equipment, deploys wireless area network (WAN). Operates Dräger X-pids remotely, watches ProRAE guardian, communicates readings to field scientist(s), troubleshoots units and systems, exports data.

Command Staff Safety Officer (SOFR)—Command Staff Support, typically located at the Incident Command Post (ICP) and in direct communication with Sentinel Protocol Supervisor and Unified Command, consisting of the Responsible Party Senior Leadership, Federal, State, and Local Authorities for safety reporting and Chain of Command.

Data Manager (DM)—Interprets data into overlaying graphs and tables for reports.

Equipment and Supplies

Listed below are tables of the equipment needed to operate the Remote Chemical Speciation system categorized by their location when in use.

Command Center Equipment

The following equipment will be set up at the command post for coordination efforts.

| Equipment | Supplies | Description |
| --- | --- | --- |
| Computer | Laptop<br>Charging Cable<br>Power source<br>TeamViewer Account<br>Mouse | TeamViewer connected to Dräger control units for remote screen control (internet required, multiple monitors preferred) |
| ProRAE Guardian Kit | ProRAE Guardian Software<br>RAElink Modem<br>Antenna | |
| Internet | Cradlepoint<br>Charging Cable<br>Power Source | Supplies internet for field wireless area network (WAN) between computer and Dräger control units |
| Walkie Talkie | Charging Ports<br>Power source | Coordination between Equipment Operator and Field Scientists |

Heavy Machinery Equipment

The following equipment will be set up strategically inside and outside the heavy machinery operator's cab.

| Equipment | Supplies | Description |
| --- | --- | --- |
| Dräger X-pid 8500/9500 | Sensor Unit<br>Control Unit<br>Sensor and control unit charging cables<br>1 to 3-way Auxiliary Plug<br>Inverter<br>Power source | Breathing zone chemical speciation; TeamViewer Host app and CX File Explorer installed on control unit |
| MultiRAE Pro | Travel Charger<br>Auxiliary Power Cable<br>Power Source | Telemitting data from operator breathing zone to AreaRAE Mesh |
| AreaRAE Plus | Antenna | Telemitting exterior atmosphere data and MultiRAE Pro data to ProRAE Guardian |

Field Equipment

| Equipment | Supplies | Description |
| --- | --- | --- |
| Dräger X-pid 8500/9500 | Sensor Unit<br>Control Unit<br>Sensor and control unit charging cables<br>Inverter<br>Power source | Confirmation readings and work area worker monitoring |
| MultiRAE Pro | Travel Charger<br>Auxiliary Power Cable<br>Power Source | Confirmation readings and work area worker monitoring |
| Walkie Talkie | | Receive updates about PPE recommendations and communicate work environment changes to Dräg-ER NET Operator |
| Google WiFi | Repeaters<br>Ethernet Cable<br>Portable Charger<br>Charging Cables<br>Plastic Tubs<br>Bungee Cords | WiFi repeaters expand wireless area network (WAN) in to decrease |

-continued

| Equipment | Supplies | Description |
|---|---|---|
| Booster Antenna | Tripods Antenna Tripod Large Jockey Battery Large Plastic Bag | |

Procedures

Procedures outlined in this section are to assist in proper set-up, operation, data extraction, and shift conclusion.

Deployment and Documentation of Remote Operation Equipment Equipment Deployment Form Each piece of heavy machinery to be used during the shift in or near areas of potential exposure should have a set of instruments including an AreaRAE, a MultiRAE Pro, and a Dräger. The set-up is to be documented at the beginning of each shift on the Equipment Deployment Form to track start times and what instruments are assigned to what piece of equipment. Once a set of instruments are assigned to a piece of machinery, they are to stay with that machinery unless it is necessary to swap an instrument out or an optimization is made.

Instrument Placement

An AreaRAE will be fixed to the outside of the cab, to represent ambient conditions, out of the way of any moving parts or joints, out of the line of sight of the operator, and out of the way of any exhaust. A MultiRAE Pro will be fixed inside of the cab in a location that is representative of the operator's breathing zone, has an unobstructed air intake, does not impair the operator's line of sight or ability to operate machinery, and is not in the way of any moving parts. In order to telemit data from both the AreaRAE and the MultiRAE, the mesh radio on the AreaRAE and the radio on the MutliRAE will need to be turned on and both set to the same channel. The channels will need to be unique to each set of devices to prevent duplicate transmittance of MultiRAE Pros.

The Dräger sensor unit and control unit are fastened to the back of the head rest of the operator's chair. Ensure that the sensor unit and control units are on and connected, and that the TeamViewer Host app is open. This is done using zip ties to fasten the sensor unit so that the dust/water trap is pointing upwards and the two inlet/outlet orifices next to the charging port are facing away from the chair. The zip ties are tightened around the slimmer portion of the sensor unit and the connection between the chair back and headrest in a way that does not inhibit access to the power button nor damage the unit.

The MultiRAE Pro and Dräger units are plugged into a power source inside the cab. The configuration of the power source will not restrict operator mobility, line of sight, or be in the way of any moving parts. When considering the path of the charging wires; ensure that they are not too loose where they could snag and unplug, and not so tight that vibrations and/or operator chair movements will impact them.

Operation

Analysis Strategy

Analysis programs are to be built around possible VOC constituents found in the work area. Some analytes cannot be built into the same program due to overlapping retention times (i.e., m-xylene and p-xylene). For these occurrences, it is prudent to build multiple analysis programs that only differ in the overlapping constituents.

When building the analysis programs, the run count can be set to run the selected analytes up to 10 times in a program. When using an analysis program with a run count greater than one, the control unit will display the symbol Ø next to a value for each analyte. The Ø symbol indicates the running average for that analyte. Although a result can be seen for each run of the program as well as the average of that set, only the averages will be saved and exported. The most common situation that warrants decreasing the analysis count is the #f002 error described in section 12.0 Troubleshooting. As a preventative measure, multiple analysis programs should be built so that each set of analytes has a program with multiple analysis counts and a program with an analysis count of one. The #f002 error most often appears during episodes of high concentrations of volatiles. Paying attention to ProRAE to know when to change to the single run analysis programs will reduce lost data from Dräger app crashes. It is important to ensure that the programs are identical throughout all devices in circulation for this system.

Operating the System

After the instrumentation has been set up in the heavy equipment, the field scientist will communicate with the Sentinel Protocol operator to inform them of which pieces of equipment are currently active and what kind of work is being performed. Measurements will be collected remotely whenever the operator is in the cab and the RAE instruments run throughout the work shift. Measurements will also be collected more frequently whenever VOCs are detected, especially in high concentrations. Upon notification of heavy equipment operation, the Sentinel Protocol operator will begin the appropriate analysis program and create a project log of what heavy equipment is being used. After the analysis program has run, the record will be saved to a folder labeled with the date, AreaRAE, and Dräger unit numbers (i.e., Aug. 9, 2020 KRMA-0299 AR35). When the field scientist radios that a heavy equipment operator is leaving the cab for breaks, lunch, etc., the Dräger is to be put in Standby Mode and a project log documenting which vehicle has stopped work is to be made.

Action levels will be determined based on the Sampling and Analysis Plan approved by Incident Command and General Staff prior to commencement of any work operations. Most all chemical action levels will be based ACGIH TLV-TWA's, a time-weighted average chemical action level based on an 8-hr working day, TLV-STEL, a 15-minute short term exposure limit. All action levels will be discussed in the pre-job briefing with all parties, as well as the actions to be taken, if an exceedance should occur.

If an action level is exceeded, take note of the time and run the analysis program again. If the result of the confirmation reading is sustained above action level, a radio call to the field scientist and equipment operator is performed to recommend donning appropriate PPE. The same protocol is followed when readings fall below action level to inform worker that conditions are safe to doff PPE. Anytime a PPE change is made, it will be documented in the Comments field found on the analysis program save page and a project log is to be made. It is useful to watch the Data Graphs on ProRAE in order to correlate data trends with action level exceedances. All action level exceedances and actions taken to be reported up Chain of Command to IH Supervision and SOFR, as well as change in conditions and doffing of PPE. It is imperative to make sure that the IH Supervisor and the SOFR are aware of changing conditions with work operations. Communication is the key aspect of safety within the Sentinel Protocol.

Any equipment location changes will be documented in the Equipment Deployment Form and project logged. Additionally, data will be exported and sent to the DM before the instrument goes back on the shelf.

Work Shift Close-Out

Instrument

After the work in the field has been completed for the day and all stop work project logs have been created, the field scientist will collect the instrumentation for data export, calibration, and battery recharge. End times for instrumentation are to be documented on the Equipment Deployment Form.

Data Export

Records of the readings collected throughout the work shift are to be exported to the CX File explorer where they are compressed and sent to a data manager. This is done by selecting the folder that is to be exported and selecting the upward facing arrow. After the export is complete, the files in the CX File Explorer folder labeled Dräger X-pid will need to be checked to ensure a successful export. Each record will have two files: a .draegerxpid2 file and an excel file. If all records between the first and last recorded timestamps noted in the Dräger app display the correct file types, then the folder is ready to be compressed and emailed to the data manager via the Gmail app on the phone. Upon confirmation of receipt from the DM, measurements and exports should be deleted/cleared from the Control Units every 3 days to ensure the Dräger App does not run out of internal memory.

REFERENCES

The following references are hereby incorporated by reference:
- Dräger Safety AG & Co. KGaA, Dräger X-pid 8500/9000/9500 Technical manual: 8-17
- Dräger X-pid 8500/9500 User Manual
- RAE Systems User Manual
- Technical Note TN-106: Guideline to PID Response, Chemical Ionization Energy, & 10.6 eV Lamp Correction Factors
- Technical Note TN-156: LEL Sensor Information and Correction Factors The following references are cited in the specification:
ACGIH. (2020). *Guide to Occupational Exposure Values*. Cincinnati: American Conference of Governmental Industrial Hygienists.
Aghaeipoor, M. (2017). *Characterization of preliminary data of indoor air quality in diesel construction equipment cabs* (Order No. 10274506). Available from Dissertations & Theses @ Oklahoma State University—Stillwater; ProQuest Dissertations & Theses Global. (1988653479). Tehran: University of Tehran.
Brennan, W. (2012). Managing risks to lone workers. *Occupational Health*, 64 (12), 27-29.
Carpenter, D. O., Arcaro, K., & Spink, D. C. (2002). Understanding the Human Health Effects of Chemical Mixtures. *Environmental Health Perspectives*, 25-42.
Chen, L., Hu, G., Fan, R., Lv, Y., Dai, Y., & Xu, Z. (2018). Association of PAHs and BTEX exposure with lung function and respiratory symptoms among a nonoccupational population near the coal chemical industry in Northern China. *Environment International* 120, 480-488.
CSB. (2019). *Storage Tank Fire at Intercontinental Terminals Company, LLC (ITC) Terminal: Factual Update*. Washington, DC: U.S. Chemical Safety and Hazard Investigation Board: Office of Congressional, Public, and Board Affairs.
CSB. (2020). *Fires and Explosions at TPC Group Port Neches Operations Facility*. Washington, DC: U.S. Chemical Safety and Hazard Investigation Board: Office of Congressional, Public, and Board Affairs.
Dewulf, J., & Langenhove, H. V. (2002). Analysis of volatile organic compounds using gas chromatography. *Trends in Analytical Chemistry, Vol.* 21, 637-646.
Do, D. H., Walgraeve, C., Amare, A. N., Barai, K. R., Parao, A. E., Demeestere, K., & Langenhove, H. V. (2015). Airborne volatile organic compounds in urban and industrial locations in four developing countries. *Atmospheric Environment* 119, 330-338.
Dräger. (2021 Nov. 9). *Dräger X-pid* 8500 *User Manual*. Retrieved from Dräger: https://www.draeger.com/Products/Content/x-pid-8500-9000-9500-technical-manual-ifu-9033850-en.pdf
EPA. (2021 Feb. 9). *Technical Overview of Volatile Organic Compounds*. Retrieved from United States Environmental Protection Agency: https://www.epa.gov/indoor-air-quality-iaq/technical-overview-volatile-organic-compounds#3
Gaffney, S. H., Panko, J. M., Unice, K. M., Burns, A. M., Kreider, M. L., Gelatt, R. H., . . . Paustenbach, D. J. (2011). Occupational exposure to benzene at the ExxonMobil Refinery in Baytown, TX (1978-2006). *Journal of Exposure Science and Environmental Epidemiology* (21), 169-185.
Galán-Madruga, D., & García-Cambero, J. (2022). An optimized approach for estimating benzene in ambient air within an air quality monitoring network. *Journal of Environmental Sciences* 111, 164-174.
Garcia, J. J., Gresh, R. E., Gareis, M. B., & Haney, R. A. (1999). *Effectiveness of Cabs for Dust and Silica Control on Mobile Mining Equipment*. Pittsburgh: Mine Safety and Health Administration.
Garg, A., Akbar, M., Vejerano, E., Narayanan, S., Nazhandali, L., Marr, L. C., & Agah, M. (2015). Zebra GC: A mini gas chromatography system for trace-level determination of hazardous air pollutants. *Sensors and Actuators B* 212, 145-154.
GCOR Committee, G. C. (2015 Apr. 1). *GCOR*. Retrieved from General Code of Operating Rules: http://fwwr.net/assets/gcor-effective-2015-04-01.pdf
Heibati, B., Pollitt, K. J., Charati, J. Y., Ducatman, A., Shokrzadeh, M., Karimi, A., & Mohammadyan, M. (2018). Biomonitoring-based exposure assessment of benzene, toluene, ethylbenzene and xylene among workers at petroleum distribution facilities. *Ecotoxicology and Environmental Safety* 149, 19-25.
INDSCI, I. S. (2020). *Industrial scientific introduces lone worker monitoring solution: The TGX gateway enables live monitoring for workers in remote locations*. New York: PR Newswire Retrieved from http://argo.library.okstate.edu/login?url=https://www.proquest.com/wire-feeds/industrial-scientific-introduces-lone-worker/docview/2398525842/se-2?accountid=4117.
Koziel, J., Jia, M., Khaled, A., Noah, J., & Pawliszyn, J. (1999). Field Air Analysis with SPME Device. *Analytica Chimica Acta*, 153-162.
Lassalle, G., Fabre, S., Credoz, A., Dubucq, D., & Elger, A. (2020). Monitoring oil contamination in vegetated areas with optical remote sensing: A comprehensive review. *Journal of Hazardous Materials* 393.

ldh.la.gov. (2010 Sep. 18). *Oil Spill Health Effect Summary—MS Canyon 252 Oil Spill Surveillance Report*. Retrieved from Louisiana Department of Health and Hospitals Office of Public Health: https://ldh.la.gov/assets/docs/SurveillanceReports/Oil-SpillHealth/_OilSpillSurveillance2010_16.pdf Loomis, D., Guyton, K. Z., Grosse, Y., Ghissassi, F. E., Bouvard, V., Benbrahim-Tallaa, L., . . . Group, I. A. (2017). Carcinogenicity of benzene. *The Lancet Oncology*, 1574-1575.

Manes, G., Collodi, G., Fusco, R., Gelpi, L., & Manes, A. (2012). Continuous Remote Monitoring in Hazardous Sites Using Sensor Technologies. *International Journal of Distributed Sensor Networks*, 1-13.

Mickunas, D. B., Zarus, G. M., Turpin, R. D., & Campagna, P. R. (1995). Remote optical sensing instrument monitoring to demonstrate compliance with short-term exposure action limits during cleanup operations at uncontrolled hazardous waste sites. *Journal of Hazardous Materials* 43, 55-65.

Monosson, E. (2005). Chemical Mixtures: Considering the Evolution of Toxicology and Chemical Assessment. *Environmental Health Perspectives* 113, 383-390.

Nasreddine, R., Person, V., Serra, C. A., & Le Calvé, S. (2016). Development of a novel portable miniaturized GC for near real-time low level detection of BTEX. *Sensors and Actuators B*224, 159-169.

NIOSH. (2019 Oct. 30). *Centers for Disease Control and Prevention—The National Institute for Occupational Safety and Health*. Retrieved from NIOSH Pocket Guide to Chemical Hazards—Propane: https://www.cdc.gov/niosh/npg/npgd0524.html NIOSH. (2019 Oct. 30). *Centers for Disease Control and Prevention—The National Institute for Occupational Safety and Health*. Retrieved from NIOSH Pocket Guide to Chemical Hazards—PCB: https://www.cdc.gov/niosh/npg/npgd0126.html Olaguer, E. P., Stutz, J., Erickson, M. H., Hurlock, S. C., Cheung, R., Tsai, C., . . . Neish, B. S. (2017). Real time measurement of transient event emissions of air toxics by tomographic remote sensing in tandem with mobile monitoring. *Atmospheric Environment* 150, 220-228.

OSHA. (2004 Jan. 1). *OSH Act of* 1970, *General Duty Clause*. Retrieved from United States Department of Labor: Occupational Safety and Health Administration: https://www.osha.gov/laws-regs/oshact/completeoshact OSHA. (2019 May 14). 29 *CFR* 1910.120—*Hazardous waste operations and emergency response*. Retrieved from United States Department of Labor: Occupational Safety and Health Administration: https://www.osha.gov/laws-regs/regulations/standardnumber/1910/1910.120

OSHA. (2019 May 14). *United States Department of Labor—CFR* 1910.120 *Hazardous Waste Operations and Emergency Response*. Retrieved from OSHA.gov: https://www.osha.gov/laws-regs/regulations/standardnumber/1910/1910.120

Pezzullo, L., & Filippo, R. D. (2009). Perceptions of industrial risk and emergency management procedures in Hazmat Logistics: A qualitative mental model approach. *Safety Science*, 537-541.

Pohanish, R. P. (2004). *HazMat Data: For First Response, Transportation, Storage, and Security*. Hoboken, New Jersey: John Wiley & Sons, Inc.

Potera, C. (2011). INDOOR AIR QUALITY: Scented Products Emit a Bouquet of VOCs. *Environmental Health Perspectives*, A16.

RAE. (2001). AreaRAE Remote Monitoring System. Retrieved from RAE Systems Inc.: https://www.apc.co.nz/site/associatedprocess/files/PID%27s/App%20&%20Tech%20Notes/AreaRAE-White%20Paper.pdf RAE. (2015 Oct. 1). *ProRAE Guardian User's Guide*. Retrieved from RAE Systems by Honeywell: https://safety.honeywell.com/content/dam/his-sandbox/products/gas-and-flame-detection/documents/ProRAE20Guardian20User27s20Guide20v1.1120-20RevL.pdf RAE. (2017 Jul. 1). *AreaRAE Plus & AreaRAE Pro User's Guide*. Retrieved from RAE Systems by Honeywell: https://prod-edam.honeywell.com/content/dam/honeywell-edam/sps/his/en-us/products/gas-and-flame-detection/documents/AreaRAE2_UsersGuide_Rev_B.pdf?download=false RAE. (2017 Sep. 1). *MultiRAE Series User's Guide*. Retrieved from RAE Systems by Honeywell: https://prod-edam.honeywell.com/content/dam/honeywell-edam/sps/his/en-us/products/gas-and-flame-detection/documents/MultiRAE_UsersGuide_Rev_J_EN.pdf?download=false RAE. (2021 Nov. 9). *A Guideline for PID Instrument Response*. Retrieved from Honeywell—RAE Systems Technical Note TN-106: https://safety.honeywell.com/content/dam/his-sandbox/products/gas-and-flame-detection/documents/Technical-Note-106_A-Guideline-for-Pid-Instrument-Response.pdf RAE. (2021 Nov. 9). *Handheld PID Monitors*. Retrieved from Honeywell-RAE Systems Instrumentation: https://prod-edam.honeywell.com/content/dam/honeywell-edam/sps/his/en-us/products/gas-and-flame-detection/documents/3G20PID20User27s20Guide20Rev20A_English_0.pdf Ran, J., Qiu, H., Sun, S., & Tian, L. (2018). Short-term effects of ambient benzene and TEX (toluene, ethylbenzene, and xylene combined) on cardiorespiratory mortality in Hong Kong. *Environment International* 117, 91-98.

Roth, E. M., Multer, J., & Raslear, T. (2006). Shared Situation Awareness as a Contributor to High Reliability Performance in Railroad Operations. *Organization Studies*, 27(7), 967-987.

Sexton, K., & Hattis, D. (2007). Assessing Cumulative Health Risks from Exposure to Environmental Mixtures—Three Fundamental Questions. *Environmental Health Perspectives*, 115, 825-832.

Straub, F. (2018). HIGH RISK, LONE WORKER: The unacceptable risk. *Professional Safety*, 63(7), 30-35.

Sun, J., Cui, D., Chen, X., Zhang, L., Cai, H., & Li, H. (2013). Fabrication and characterization of microelectromechanical systems-based gas chromotography column with embedded micro-posts for separation of environmental carcinogens. *Journal of Chromatography A* 1291, 122-128.

Tian, J., Tan, J., Hu, N., Liu, T., Wang, Y., Zhong, H., . . . Zhang, X. (2018). Characteristics analysis for total volatile organic compounds emissions of methanol-diesel fuel. *Journal of the Energy Institute* 91, 527-533.

Tunsaringkarn, T., Siriwong, W., Rungsiyothin, A., & Nopparatbundit, S. (2012). Occupational Exposure of Gasoline Station Workers to BTEX Compounds in Bangkok, Thailand. *The International Journal of Occupational and Environmental Medicine*, 117-125.

Venkatesan, A. K., & Halden, R. U. (2015). Effective Strategies for Monitoring and Regulating Chemical Mixtures and Contaminants Sharing Pathways of Toxicity.

*International Journal of Environmental Research and Public Health* 12, 10549-10557.

WHO, W. H. (2000). *Air quality guidelines for Europe.* Copenhagen: WHO Regional Office for Europe.

Wiley, J. (2017). Evolutionary toxicology: Toward a unified understanding of life's response to toxic chemicals. *Evolutionary Applications* 10, 745-751.

Wilson, J. S. (2012). Remote Real-time Industrial Hygiene Monitoring. *Australian Petroleum Production and Exploration Association Limited.*

You, D.-W., Seon, Y.-S., Jang, Y., Bang, J., Oh, J.-S., & Jung, K.-W. (2020). A portable gas chromatograph for real-time monitoring of aromatic volatile organic compounds in air samples Author links open overlay panel. *Journal of Chromatography A,* 461267.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A system for collecting and monitoring exposure data for an isolated worker confined to a work area in a hazardous materials environment, comprising:
   a) a host computer and a display monitor located remotely from the hazardous materials environment;
   b) a first air monitor disposed outside the work area for monitoring levels of volatile organic compounds (VOCs) in ambient air outside the work area to provide a first layer of exposure protection for the isolated worker confined inside the work area by identification of potential for migration of the VOCs from the outside to the inside of the work area, the first air monitor being operably connected to the host computer to provide a display of the VOCs outside the work area in real-time on the display monitor;
   c) a second air monitor disposed inside the work area for monitoring levels of VOCs in ambient air inside the work area to provide a second layer of exposure protection for the isolated worker confined inside the work area by identification of potential for migration of the VOCs from the outside to the inside of the work area, the second monitor being operably connected to the host computer to provide a display of the VOCs inside the work area in real-time on the display monitor; and
   d) a gas sensor disposed inside the work area to speciate the VOCs inside the work area into constituent chemicals and respective concentrations when the VOCs inside the work area reach a certain level to provide a third layer of exposure protection for the isolated worker confined inside the work area, the gas sensor being operably connected to the host computer to provide a display of the constituent chemicals in real-time on the display monitor.

2. The system as in claim 1, wherein the first air monitor is a 5-gas monitor.

3. The system as in claim 2, wherein the second air monitor is a 5-gas monitor.

4. The system as in claim 1, wherein the gas sensor includes a gas chromatography with a photoionization detector, the gas sensor including a control unit.

5. The system as in claim 4, wherein the control unit is configured to allow the host computer to control the gas sensor.

6. The system as in claim 1, wherein the work area includes an interior of a cab of a heavy equipment.

7. The system as in claim 6, wherein the first air monitor is attached to an exterior portion of the cab of the heavy equipment.

8. The system as in claim 6, wherein the second air monitor is disposed inside the cab of the heavy equipment within a breathing zone of the isolated worker confined inside the cab.

9. Method for collecting and monitoring exposure data for an isolated worker confined to a work area in a hazardous material environment, comprising:
   a) remotely monitoring levels of volatile organic compounds (VOCs) in ambient air outside the work area of the isolated worker in real-time to provide a first layer of exposure protection for the isolated worker confined inside the work area by identification of potential for migration of the VOCs from the outside to the inside of the work area;
   b) remotely monitoring levels of VOCs in ambient air inside the work area occupied by the isolated worker in real-time to provide a second layer of exposure protection for the isolated worker confined inside the work area by identification of potential for migration of the VOCs from the outside to the inside of the work area; and
   c) remotely performing gas chromatography and photoionization detection in real-time to speciate the VOCs inside the work area when the VOCs inside the work area reach a certain level to provide a third layer of exposure protection for the isolated worker confined inside the work area.

10. The method as in claim 9, and further comprising monitoring for benzene, toluene, ethyl-benzene, xylenes (BTEX) levels inside the work area.

11. The method as in claim 10, and further comprising the step of monitoring for n-hexane, and 1,3 butadiene levels inside the work area.

12. The method as in claim 9, wherein the work area includes an interior of a cab of a heavy equipment, and further comprising the step of attaching a first air monitor to an exterior portion of the cab.

13. The method as in claim 12, and further comprising the step of disposing a second air monitor overhead inside the cab when the isolated worker is confined to inside the cab of the heavy equipment.

14. A system for collecting and monitoring exposure data for an isolated worker confined inside a cab of a heavy equipment in a hazardous materials environment, comprising:
   a) a host computer and a display monitor located remotely from the hazardous materials environment;
   b) a first air monitor disposed outside the cab for monitoring levels of volatile organic compounds (VOCs) in ambient air outside the cab to provide a first layer of exposure protection for the isolated worker confined inside the cab by identification of potential for migration of the VOCs from the outside to the inside of the cab, the first air monitor being operably connected to the host computer to provide a display of the VOCs outside the cab in real-time on the display monitor;
   c) a second air monitor disposed inside the cab for monitoring levels of VOCs in ambient air inside the cab to provide a second layer of exposure protection for the isolated worker confined inside the cab by identification of potential for migration of the VOCs from the outside to the inside of the cab, the second monitor being operably connected to the host computer to provide a display of the VOCs inside the cab in real-time on the display monitor; and d) a gas sensor comprising a gas chromatography and photoionization detector disposed inside the cab to speciate the VOCs inside the cab into constituent chemicals and respective concentrations when the VOCs inside the cab reach a certain level to provide a third layer of exposure protection for the isolated worker confined inside the cab, the gas sensor being operably connected to the host computer to provide a display of the constituent chemicals in real-time on the display monitor.

15. The system as in claim 14, wherein the first air monitor is attached to an exterior portion of the cab.

16. The system as in claim 15, wherein the second air monitor is disposed within a breathing zone of the isolated worker confined inside the cab.

17. The system as in claim 15, wherein the second air monitor is disposed overhead inside the cab.

18. The system as in claim 15, wherein the gas sensor is attached to a headrest of a chair of the isolated worker confined inside the cab.

* * * * *